United States Patent
Napau et al.

(10) Patent No.: US 8,556,762 B2
(45) Date of Patent: Oct. 15, 2013

(54) POWER SEAT HEIGHT ADJUSTER MECHANISM

(75) Inventors: Mircea Napau, Sterling Heights, MI (US); Ioan Napau, Troy, MI (US); Mike Chupa, Grosse Pointe Park, MI (US); Robert James Bachula, Macomb, MI (US)

(73) Assignee: CRH North America, Inc., Warren, MI (US)

( * ) Notice: Subject to any disclaimer, the term of this patent is extended or adjusted under 35 U.S.C. 154(b) by 821 days.

(21) Appl. No.: 12/405,371

(22) Filed: Mar. 17, 2009

(65) Prior Publication Data

US 2010/0237216 A1    Sep. 23, 2010

(51) Int. Cl.
*F16H 3/70* (2006.01)

(52) U.S. Cl.
USPC .......................................... 475/170; 475/173

(58) Field of Classification Search
USPC ........... 475/168–181; 74/421 A; 297/1–463.2
See application file for complete search history.

(56) References Cited

U.S. PATENT DOCUMENTS

| | | | |
|---|---|---|---|
| 2,776,678 A | 1/1957 | Savage | 140/71 |
| 2,868,271 A * | 1/1959 | Pickles | 248/419 |
| 2,954,704 A | 10/1960 | Saari | 74/466 |
| 3,289,489 A | 12/1966 | Georgiev | 74/427 |
| 3,377,874 A | 4/1968 | Scott | 74/143 |
| 3,472,087 A | 10/1969 | Ylinen | 74/143 |
| 3,626,452 A | 12/1971 | Winter et al. | 74/143 |
| 3,627,253 A | 12/1971 | Germain et al. | 248/429 |
| 3,645,148 A | 2/1972 | Schrempp | 74/423 |
| 3,768,326 A | 10/1973 | Georgiev et al. | 74/425 |
| 3,800,614 A | 4/1974 | Johnson | 74/473 R |
| 3,874,248 A | 4/1975 | Hauser et al. | 74/475 |
| 3,981,473 A | 9/1976 | Nagai | 248/430 |
| 4,515,029 A | 5/1985 | Reynolds et al. | 74/339 |
| 4,762,366 A | 8/1988 | Bauer et al. | 297/367 |
| 4,765,582 A * | 8/1988 | Babbs | 248/394 |
| 4,799,403 A | 1/1989 | Dinkel et al. | 74/788 |
| 4,805,481 A | 2/1989 | Bauer et al. | 74/528 |
| 5,267,360 A * | 12/1993 | Bassil et al. | 4/560.1 |
| 5,427,345 A * | 6/1995 | Yamakami et al. | 248/394 |
| 5,433,508 A * | 7/1995 | Akima et al. | 297/410 |
| 5,709,364 A * | 1/1998 | Araki et al. | 248/421 |
| 5,865,285 A | 2/1999 | Minkenberg et al. | 192/15 |
| 5,881,854 A | 3/1999 | Rougnon-Glasson | 192/15 |
| 6,178,838 B1 | 1/2001 | Schwarzbich | 74/143 |
| 6,230,867 B1 | 5/2001 | Schwarzbich | 192/223.2 |

(Continued)

FOREIGN PATENT DOCUMENTS

| | | | |
|---|---|---|---|
| DE | 19709852 A1 * | 9/1998 | |
| DE | 102007017617 A1 * | 5/2008 | |
| WO | WO 99/41101 | 8/1999 | |
| WO | WO 2005/044617 A1 | 5/2005 | |

*Primary Examiner* — Tisha Lewis
(74) *Attorney, Agent, or Firm* — Howard & Howard Attorneys PLLC

(57) ABSTRACT

A power seat height adjuster mechanism for a seat of a vehicle includes a motor having an output shaft, a speed reduction mechanism cooperating with the output shaft of the motor to reduce an output speed of the motor, a nut drive mechanism cooperating with the speed reduction mechanism and having a translatable output member to rotate an adjustment component of the seat to adjust a height of the seat, and a locking mechanism cooperating with the speed reduction mechanism to allow the height of the seat to be adjusted and to prevent the height of the seat from moving once the height has been adjusted.

33 Claims, 38 Drawing Sheets

(56) References Cited

U.S. PATENT DOCUMENTS

| | | | |
|---|---|---|---|
| 6,253,894 B1 | 7/2001 | Schumann et al. | 192/15 |
| 6,296,311 B1 | 10/2001 | Bonk et al. | 297/367 |
| 6,488,134 B2 | 12/2002 | Becker et al. | 192/19 |
| 2002/0021038 A1* | 2/2002 | Lein et al. | 297/344.17 |
| 2009/0230753 A1* | 9/2009 | Breitfeld et al. | 297/463.1 |
| 2010/0139425 A1* | 6/2010 | Schulz et al. | 74/63 |

* cited by examiner

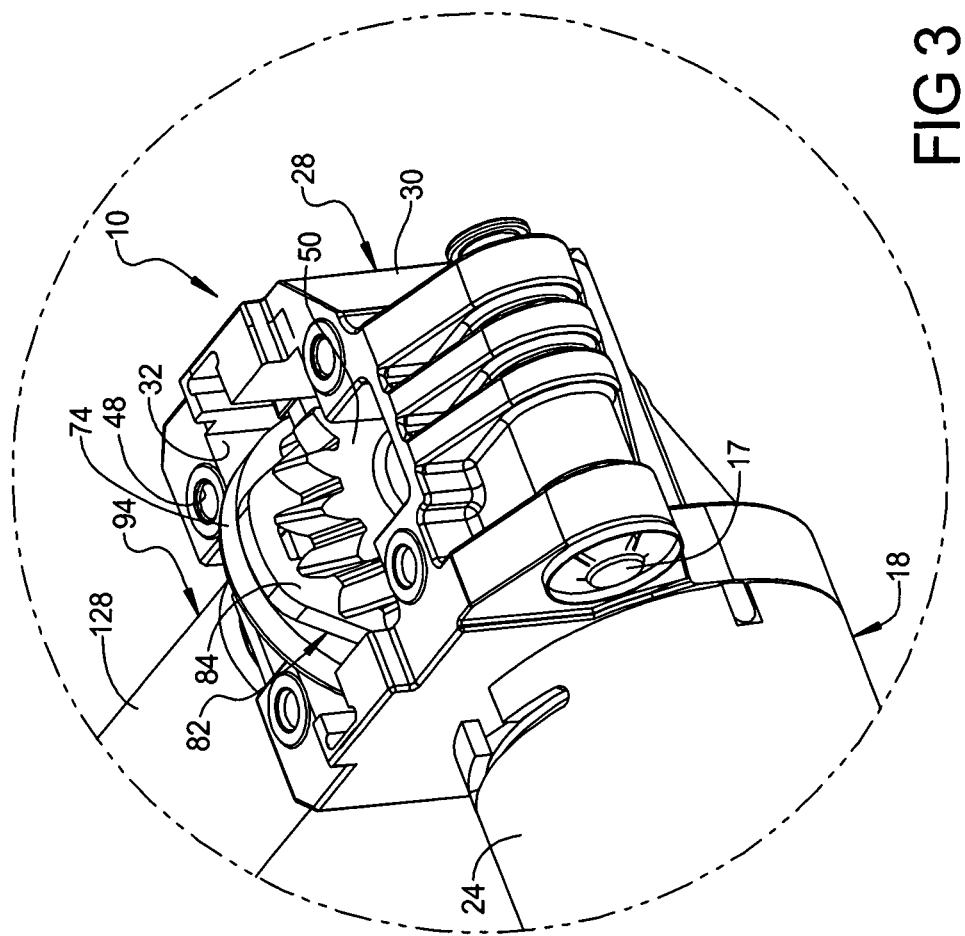
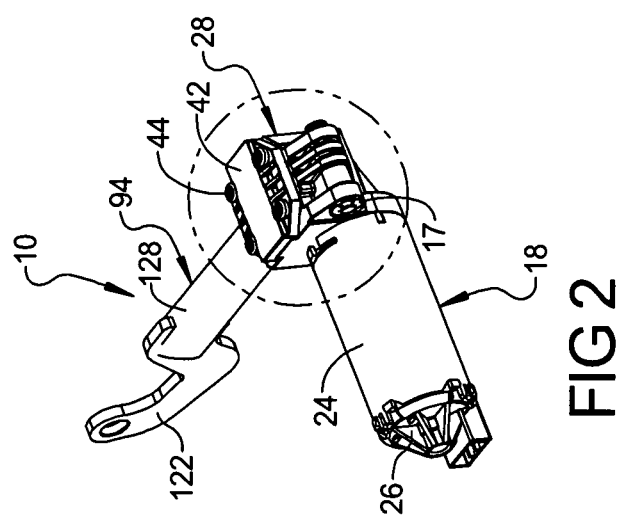

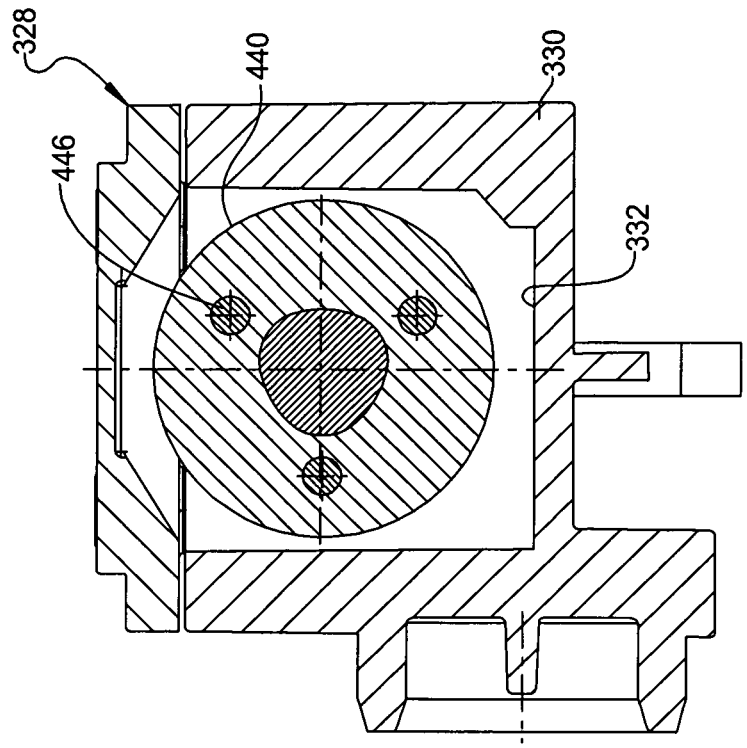
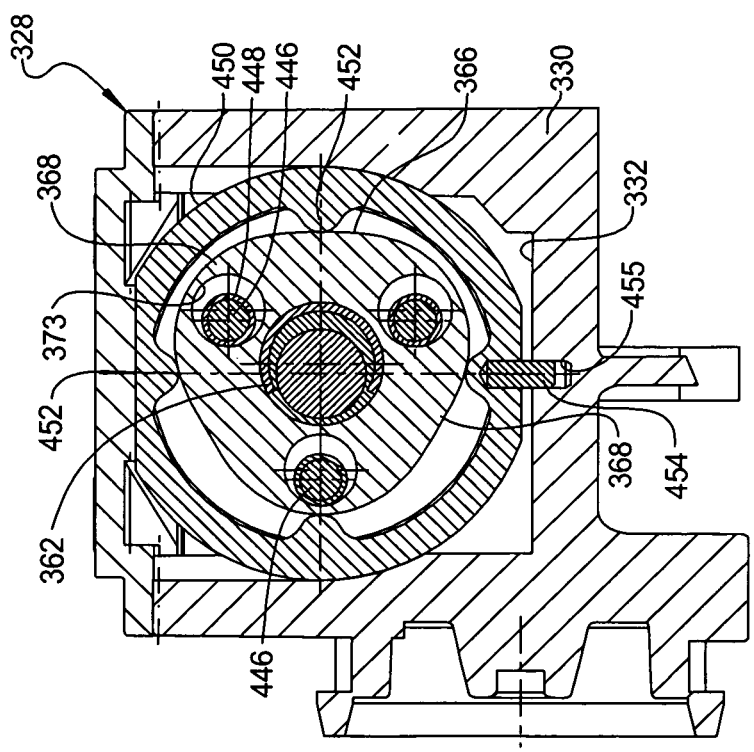
FIG 29
FIG 28

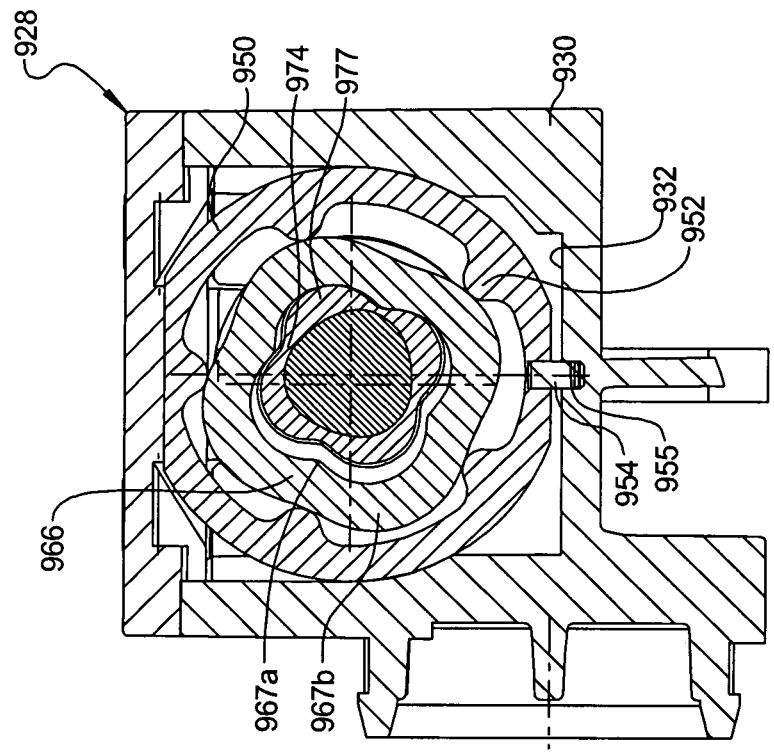
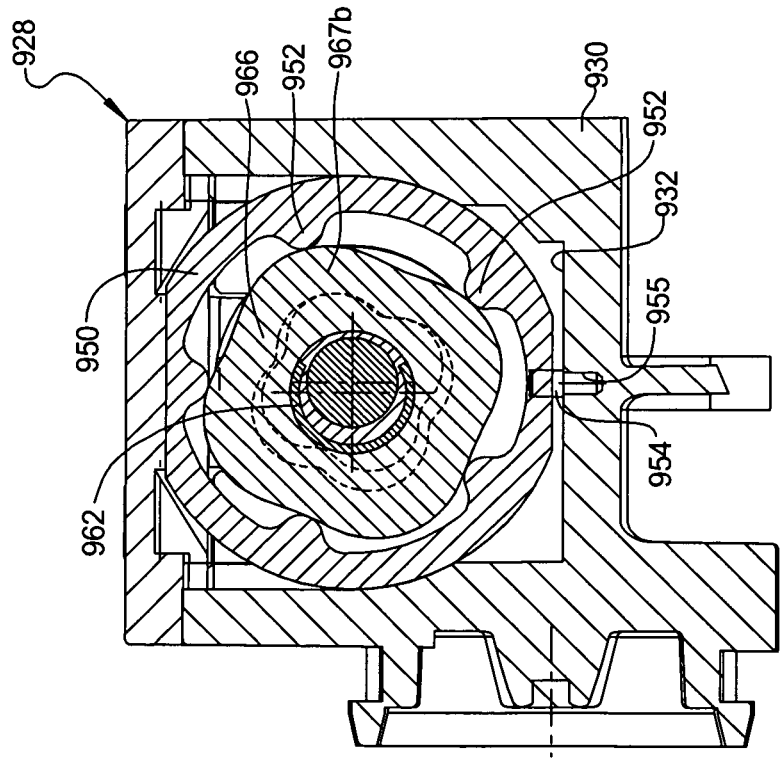

POWER SEAT HEIGHT ADJUSTER MECHANISM

BACKGROUND OF THE INVENTION

1. Field of the Invention

The present invention relates generally to seats for vehicles and, more specifically, to a power seat height adjuster mechanism for an automotive vehicle.

2. Description of the Related Art

It is known to provide a seat for a vehicle such as an automotive vehicle. Typically, the seat includes a generally horizontal seat portion and a generally vertical back portion operatively connected to the seat portion. The seat may include at least one, preferably a pair of tracks to allow horizontal adjustment of the seat portion and a pivoting mechanism to allow vertical adjustment of the seat portion. The height of the seat portion may be manually adjusted or by power.

There are an increasing number of electrically actuated components in an automotive vehicle, such as seat height adjusters, power window regulators, steering column adjusters, rear-view mirror wipers, window screen wipers, antennas regulators, sunroof adjusters, headlamps adjusters, oil pumps or water pumps. All of these components can be driven by electric motors; the size of the motor is directly linked to the couple it must provide to produce the required motion. Because of friction and backlash, it is difficult to control large output torques if they are obtained from an electric motor through a gear train. If no gearing is used, it is possible to accurately control torque output, but large torques are not possible unless heavy direct-drive motors and high-powered current amplifiers are used.

Specifically, the linear motion of a driven element, e.g. a screw, allows it to adjust the height position of an automotive seat in the presence of an input torque, regardless of the direction of rotation of the motor shaft. In addition, by a continuously operating mechanism, a position holding function of the mechanism has to be performed, regardless of the presence (crash accident) or absence (stationary height adjusted position) of the input torque.

These mechanisms are available to allow the input drive mechanism to operate the actuated element, e.g. automotive seat, in either of the two directions of rotation of the input drive. If the actuated element is permitted to be moved by the external forces (weight of the passenger or reaction forces in a crash accident), a loss in control of the actuated element may result, which is unacceptable. In addition, these external forces may backdrive the input drive mechanism, and such back forces may be detrimental to the drive motor.

The above-described seat height adjusters may subject the seat to a drop in height because rotation of the screw under the load due to vibrations, when the input torque is not present. Also, these seat height adjusters do not have reliable self-locking capability, making a total dynamic self-locking capability impossible. Further, these seat height adjusters have a low efficiency transmission.

Therefore, it is desirable to provide a power seat height adjuster mechanism for a seat of a vehicle that has an anti-backdrive spindle drive utilizing a self-locking power take-off transmission mechanism. It is also desirable to provide a power seat height adjuster mechanism for a seat of a vehicle that has an anti-backdrive spindle drive, which has a compact design in order to meet required limited space underneath a seat of an automotive vehicle. It is further desirable to provide a power seat height adjuster mechanism for a seat of a vehicle that has an anti-back drive spindle, which has a higher total efficiency of transmission. It is still further desirable to provide a power seat height adjuster mechanism that has an anti-backdrive spindle, which can be easily assembled and manufactured at a relatively low cost. Thus, there is a need in the art to provide a power seat height adjuster mechanism that meets at least one of these desires.

SUMMARY OF THE INVENTION

It is, therefore, one object of the present invention to provide a new power seat height adjuster mechanism for a vehicle.

It is another object of the present invention to provide a power seat height adjuster mechanism with an anti-backdrive mechanism to adjust a position of a seat in an automotive vehicle and which reliably provides both required load limiting and position holding functions.

It is yet another object of the present invention to provide a power seat height adjuster mechanism with a speed reducer capable of a very high gear ratio that requires a minimum of physical space.

To achieve one or more of the foregoing objects, the present invention is a power seat height adjuster mechanism for a seat of a vehicle including a motor having an output shaft. The power seat height adjuster mechanism also includes a speed reduction mechanism cooperating with the output shaft of the motor to reduce an output speed of the motor. The power seat height adjuster mechanism includes a nut drive mechanism cooperating with the speed reduction mechanism and having a translatable output member to rotate an adjustment component of the seat to adjust a height of the seat. The power seat height adjuster mechanism further includes a locking mechanism cooperating with the speed reduction mechanism to allow the height of the seat to be adjusted and to prevent the height of the seat from moving once the height has been adjusted.

One advantage of the present invention is that a new seat height adjuster mechanism is provided for a seat of a vehicle that is powered to adjust a height of a seat in an automotive vehicle. Another advantage of the present invention is that the power seat height adjuster mechanism has a two-stage speed reducer capable of achieving very high reduction ratios in a compact space. Yet another advantage of the present invention is that the power seat height adjuster mechanism has a two-stage speed reducer that easily handles large loads and torques, which is particularly useful in connection with an electric motor. Still another object of the present invention is that the power seat height adjuster mechanism has anti-back drive capability, in which the speed reducer performs the position holding function in order to prevent forces generated by the actuated element from back driving the motor. A further advantage of the present invention is that the power seat height adjuster mechanism includes a speed reducer that is suitable, for use in an electric power operated adjusting device of an automotive vehicle, such as a seat adjuster, window pane adjuster, sunroof adjuster, etc. Still a further advantage of the present invention is that the power seat height adjuster is a novel, very compact combination, between a self-locking speed reduction mechanism, coupled with a nut-screw mechanism of high power transmission efficiency.

Other objects, features, and advantages of the present invention will be readily appreciated, as the same becomes better understood, after reading the subsequent description taken in conjunction with the accompanying drawings.

BRIEF DESCRIPTION OF THE DRAWINGS

FIG. 2 is a perspective view of the power seat height adjuster mechanism of FIG. 1.

FIG. 3 is an enlarged view of a portion of the power seat height adjuster mechanism of FIG. 2 with a cover removed.

FIG. 28 is a sectional view taken along line A-A of FIG. 25 and illustrating an eccentric position at ninety degrees of operation.

FIG. 29 is a sectional view taken along line B-B of FIG. 25 and illustrating an eccentric position at ninety degrees of operation.

FIG. 62 is a sectional view taken along line A-A of FIG. 55 and illustrating an eccentric position at two hundred seventy degrees of operation.

FIG. 63 is a sectional view taken along line B-B of FIG. 55 and illustrating an eccentric position at two hundred seventy degrees of operation.

DESCRIPTION OF THE PREFERRED EMBODIMENT(S)

Figure 1:
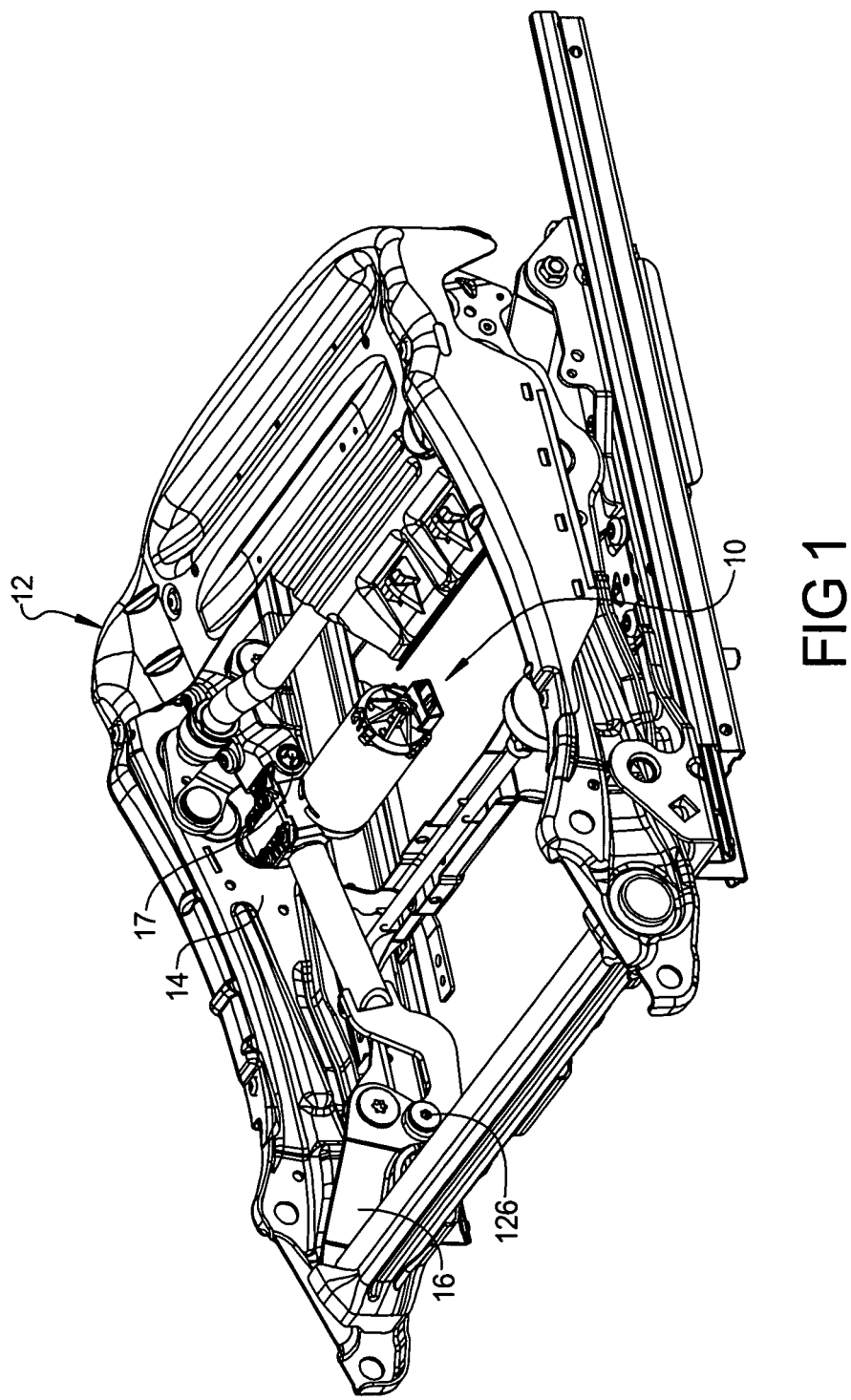
FIG. 1 is a perspective view of a power seat height adjuster mechanism, according to the present invention, illustrated in operational relationship with a seat of a vehicle.
Figure 4:
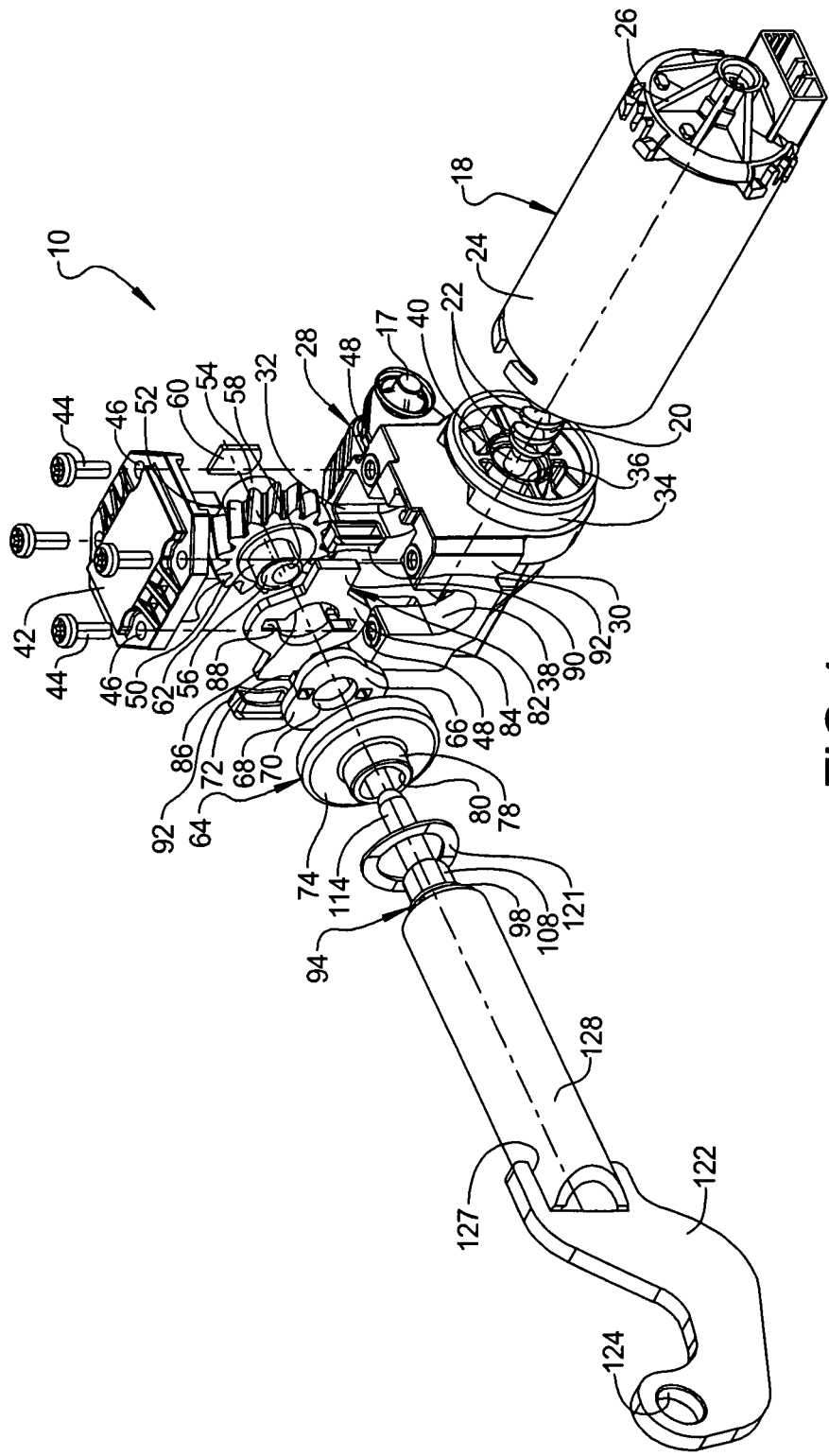
FIG. 4 is an exploded perspective view of the power seat height adjuster mechanism of FIG. 1.

Referring now to the drawings, and in particular FIGS. 1 through 13, one embodiment of a power seat height adjuster mechanism 10, according to the present invention, is shown for adjusting a height of a seat, generally indicated at 12, in a vehicle (not shown) such as an automotive vehicle. The seat 12 includes a seat frame 14 (partially shown) and an adjuster component 16 that pivots or rotates to adjust the height of the seat 12. The power seat height adjuster mechanism 10 is secured to the seat frame 14 by a suitable mechanism such as fasteners 17 and 126. It should be appreciated that the power seat height adjuster mechanism 10 is activated electrically to adjust a height of the seat 12 relative to a floorpan (not shown) of a vehicle body (not shown) of the vehicle.

Referring to FIGS. 1 through 13, the power seat height adjuster mechanism 10 includes a motor, generally indicated at 18, for powering an adjustment of the seat 12. The motor 18 is of an electric type connected to a source of electric power (not shown). The motor 18 has a rotatable output such as a worm shaft 20. The worm shaft 20 includes a plurality of teeth 22 for a function to be described. The worm shaft 20 is made of a metal material. The motor 18 includes a motor housing 24 extending axially and the worm shaft 20 is at least partially disposed for rotation within the motor housing 24. The motor 18 also includes a bearing cap 26 at one end of the motor housing 24 for rotatably supporting the worm shaft 20. The motor housing 24 has another end connected to a speed reduction mechanism 28 to be described. It should be appreciated that the worm shaft 20 rotates in both clockwise and counterclockwise directions. It should also be appreciated that input torque or speed is generated by the motor 18. It should further be appreciated that the motor 18 is conventional and known in the art.

The power seat height adjuster mechanism 10 also includes a speed reduction mechanism, generally indicated at 28, cooperating with the motor 18 and comprised of two-reduction stages: a first reduction stage and a self-locking second reduction stage. Thus, the speed reduction mechanism 28 is self-locking and reduces the output speed of the motor 18 to a nut drive mechanism 94 to be described. The speed reduction mechanism 28 includes a gearbox housing 30. The gearbox housing 30 is generally rectangular in shape and has a cavity 32 extending therein and forming an upper open end. The gearbox housing 30 also has an annular flange 34 for supporting one end of the motor housing 24. The gearbox housing 30 also has an aperture 36 disposed within the flange 34 and extending through to the cavity 32 to receive the worm shaft 20. The gearbox housing 30 has at least one, preferably a pair of generally "U" shaped recesses 38 spaced axially and extending therein and communicating with the cavity 32. The gearbox housing 30 is made of a metal or plastic material. It should be appreciated that the gearbox housing 30 is integral, unitary, and formed as one-piece.

The speed reduction mechanism 28 also includes a worm shaft bushing 40 disposed on the end of the worm shaft 20 and in an aperture (not shown) of the gearbox housing 30 to rotatably support the end of the worm shaft 20. The speed reduction mechanism 28 includes a gearbox cover 42 closing the open upper end of the gearbox housing 30. The speed reduction mechanism 28 includes at least one, preferably a plurality of fasteners 44 extending through corresponding apertures 46 in the gearbox cover 42 and into threaded apertures 48 in the gearbox housing 30 to secure the gearbox cover 42 to the gearbox housing 30.

The first stage of the speed reduction mechanism 28 includes a helical gear 50 disposed in the cavity 32 of the gearbox housing 30. The helical gear 50 has a plurality of teeth 52 to engage and mate with the teeth 22 of the worm shaft 20. The helical gear 50 has an annular back portion 54 extending axially and disposed in one of the recesses 38 to rotatably support the helical gear 50 by the gearbox housing 30. The helical gear 50 also includes an eccentric front portion 56 extending axially for a function to be described. The helical gear 50 includes an aperture 58 extending axially through the back portion 54 and front portion 56 for a function to be described. The helical gear 50 is made of a plastic material. It should be appreciated that the first stage of the speed reduction mechanism 28 may be either a worm-worm gear drive or a worm-helical gear drive.

The speed reduction mechanism 28 includes a plate 60 disposed in the cavity 32 of the gearbox housing 30 adjacent to the back portion 54 of the helical gear 50 for a function to be described. The speed reduction mechanism 28 also includes an eccentric plate 62 disposed over the front portion 56 and connected to the helical gear 50 for a function to be described.

The speed reduction mechanism 28 also includes a secondary-stage reduction comprised of a planetary gear drive, capable of low speed reduction ratio, generally indicated at 64, disposed in the cavity 32 of the gearbox housing 30. The planetary gear drive 64 includes a driving planetary gear 66 having outer teeth 68. The driving planetary gear 66 has a central aperture 70 extending axially therethrough to receive the eccentric plate 62 and front portion 56 of the helical gear 50. The driving planetary gear 66 also includes a pair of opposed projections 72 spaced radially from the aperture 70 and extending axially for a function to be described. The planetary gear drive 64 also includes a driven planetary gear 74 having inner teeth 76. The driven planetary gear 74 has an annular front portion 78 disposed in the other recess 38 to rotatably support the driven planetary gear 74 by the gearbox housing 30. The driven planetary gear 74 has an aperture 80 extending axially through the front portion 78 and therethrough for a function to be described. The gears 66 and 74 are made of metal material and are either stamped and/or sintered. It should be appreciated that the planetary gear drive 64 is a cycloidal planetary gear drive and the lobes of the two cycloidal gears have their profiles corrected (modified from theoretical profile) in order to reduce the friction in the meshing process. It should also be appreciated that, because these lobes are in compression and not in shear, it is virtually impossible to conduct to a catastrophic failure in functioning, therefore this system is suitable for heavy duty applications. It should further be appreciated that the teeth of planetary gear drive can be also of standard involute type for certain speed reduction ratios.

The power seat height adjuster mechanism 10 includes a locking mechanism, generally indicated at 82, cooperating with the speed reduction mechanism 28. The locking mechanism 82 includes a locking plate 84 disposed in the cavity 32 of the gearbox 30. The locking plate 84 has a central aperture 86 extending therethrough and a pair of opposed slots 88 spaced radially from the aperture 86 extending therethrough to receive the projections 72. The central aperture 86 is generally circular in shape. The locking plate 84 also includes an opposed pair of arms 90 extending radially and having a generally rectangular shape for a function to be described. The locking plate 84 is made of a metal material. The locking mechanism 82 also includes at least one, preferably a pair of locking plate supports 92 disposed in the cavity 32 between the cover 42 and the gearbox housing 30 and cooperating with the locking plate 84. The locking plate supports 92 are generally hollow and rectangular in shape with one locking plate support 92 receiving one of the arms 90 of the locking plate 84. The locking plate supports 92 are made of a plastic material. It should be appreciated that the locking mechanism 82 provides decomposition of wobbling motion on two perpendicular directions.

The power seat height adjuster mechanism 10 further includes a nut drive mechanism, generally indicated at 94, cooperating with the speed reduction mechanism 28 for high power transmission efficiency. The nut drive mechanism 94 includes a translatable spindle nut 98. The spindle nut 98 has a central aperture 100 extending axially therethrough and a plurality of internal threads 102 extending axially along and radially into the aperture 100 for a function to be described. The spindle nut 98 also has a plurality of external threads 104 extending axially along and radially outward with a flange 106 extending radially at one end of the threads 104 for a function to be described. The spindle nut 98 is made of a plastic material. It should be appreciated that the spindle nut 98 is a stationary or non-rotatable nut.

The nut drive mechanism 94 also includes a movable or rotatable spindle screw 108 cooperating with the spindle nut 98. The spindle screw 108 extends axially and has a plurality of external threads 110 that cooperate with the internal threads 104 of the spindle nut 98. The spindle screw 108 has a flange 112 extending radially outward at one end of the threads 110, an enlarged diameter portion 113 disposed within the aperture 80 of the driven planetary gear 74, and a reduced diameter end 114 extending axially from the enlarged diameter portion 113 and through the apertures of the planetary gear drive 64, locking mechanism 82, and helical gear 50. The reduced diameter end 114 has a cavity 116 extending axially therein. The spindle screw 108 has another end connected to a hook member 122 to be described. The spindle screw 108 is made of a metal material. It should be appreciated that the spindle screw 108 is mounted for rotation within the gearbox housing 30 and rotates relatively within the spindle nut 98. It should also be appreciated that the spindle screw 108 is the output member and the motor 18 is the input member which is skewed mounted, perpendicularly to the spindle screw 108 to the gearbox housing 30.

The nut drive mechanism 94 also includes a ball bearing 118 disposed in the cavity 116 of the spindle screw 108. The nut drive mechanism 94 includes a spring 120 disposed in the cavity 116 of the spindle screw 108 to urge the ball bearing 118 outward against the plate 60. The nut drive mechanism 94 further includes a wave washer 121 disposed about the spindle screw 108 axially between the driven planetary gear 74 and the gearbox housing 30 to urge the driven planetary gear 74 toward the driving planetary gear 66. It should be appreciated that the spindle screw 108 translates the spindle nut 98 linearly when rotated. It should also be appreciated that the spindle screw 108 produces the output torque or speed. It should further be appreciated that a high efficiency spindle drive is produced by the spindle screw 108 and nut 98.

The power seat height adjuster mechanism 10 further includes a hook member 122. The hook member 122 has a general "J" shape. The hook member 122 has an aperture 124 extending therethrough for connection to the adjuster component 16 by a suitable mechanism such as a fastener 126. The hook member 122 has a recess 127 extending axially into one end. The power seat height adjuster mechanism 10 further includes a supporting tube 128 disposed about the spindle screw 108. The supporting tube 128 has one end disposed in the recess 127 and fixedly connected to the hook member 122. The supporting tube 128 has another end with internal threads 129 threadably engaging the threads 104 of the spindle nut 98. The power seat height adjuster mechanism 10 may includes a dumping disk (not shown), washer disk (not shown), and torx screw (not shown) engaging one end of the spindle screw 108 to act as a stop to prevent the spindle nut 98 from exiting the spindle screw 108. It should be appreciated that the hook member 122, supporting tube 128, and spindle nut 98 are stationary and do not rotate. It should also be appreciated that the hook member 122, supporting tube 128, and spindle nut 98 move or translate linearly as a unit.

Figure 5:
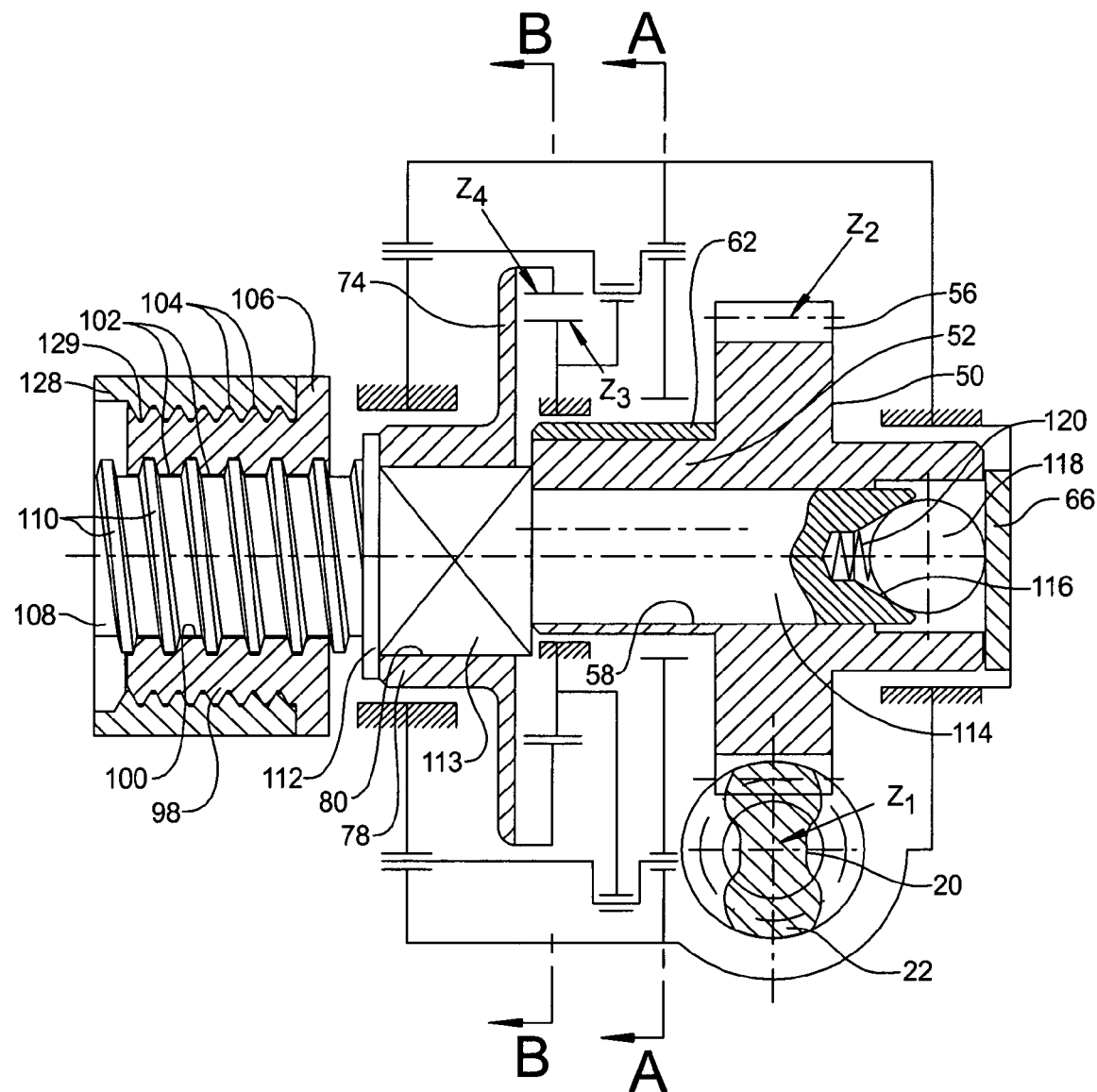
FIG. 5 is a diagrammatic view of the power seat height adjuster mechanism of FIG. 1.
Figure 7:
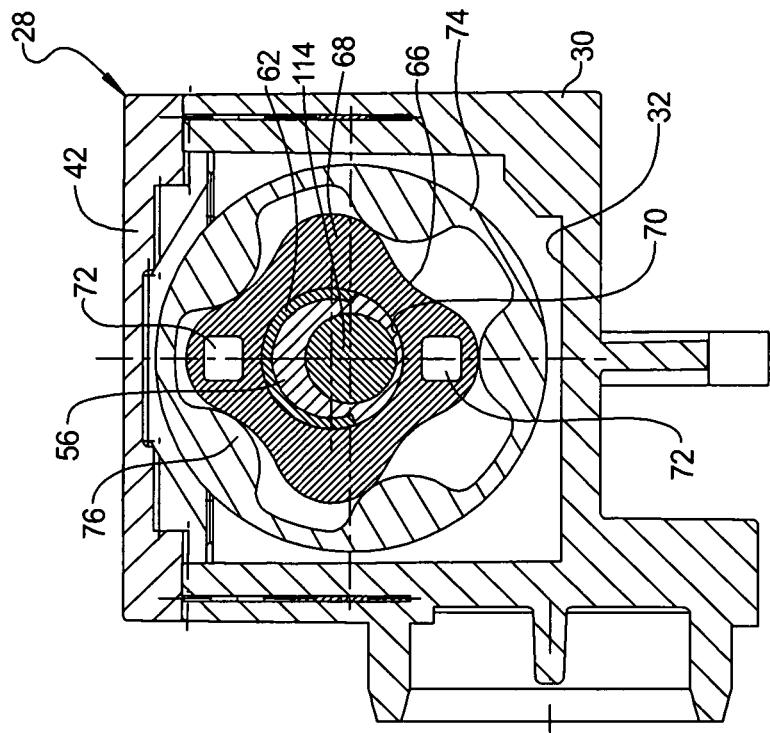
FIG. 7 is a sectional view taken along line B-B of FIG. 5 and illustrating an eccentric position at zero degrees of operation.
Figure 6:
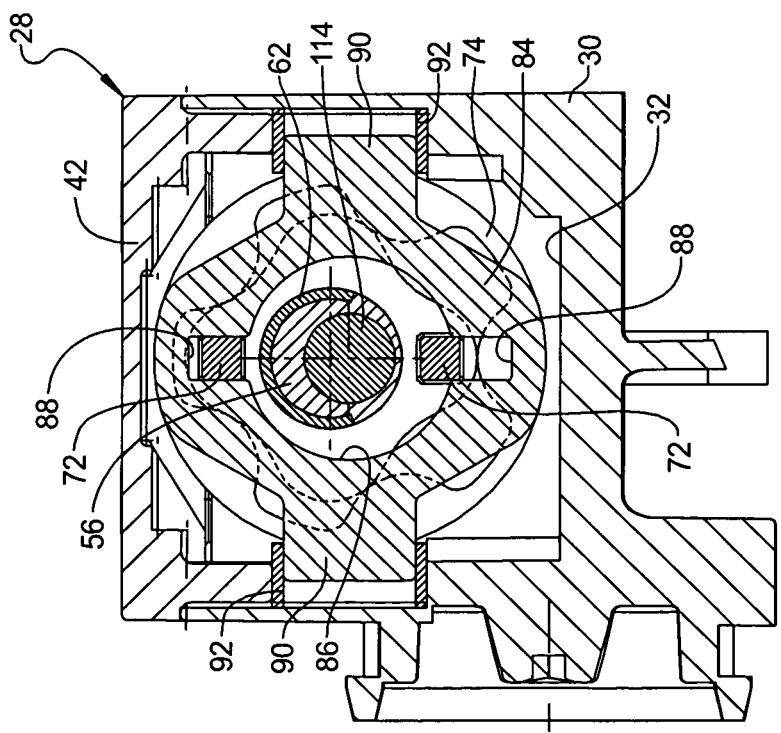
FIG. 6 is a sectional view taken along line A-A of FIG. 5 and illustrating an eccentric position at zero degrees of operation.
Figure 9:
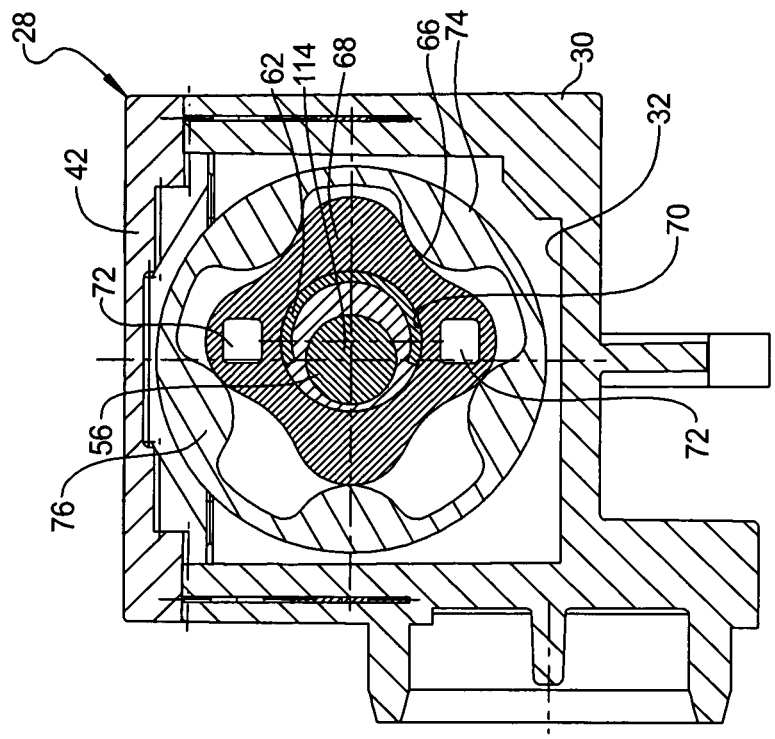
FIG. 9 is a sectional view taken along line B-B of FIG. 5 and illustrating an eccentric position at ninety degrees of operation.
Figure 8:
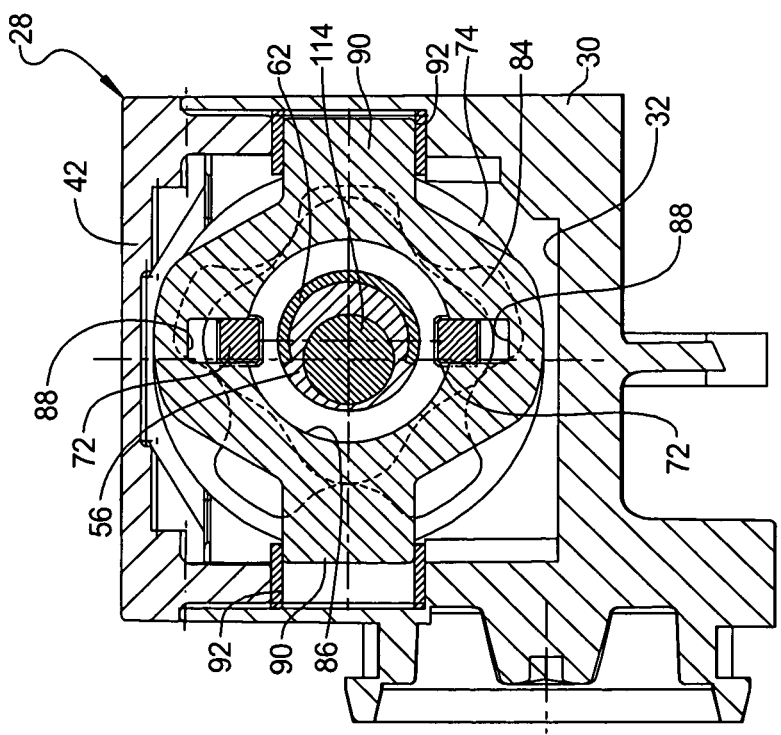
FIG. 8 is a sectional view taken along line A-A of FIG. 5 and illustrating an eccentric position at ninety degrees of operation.
Figure 11:
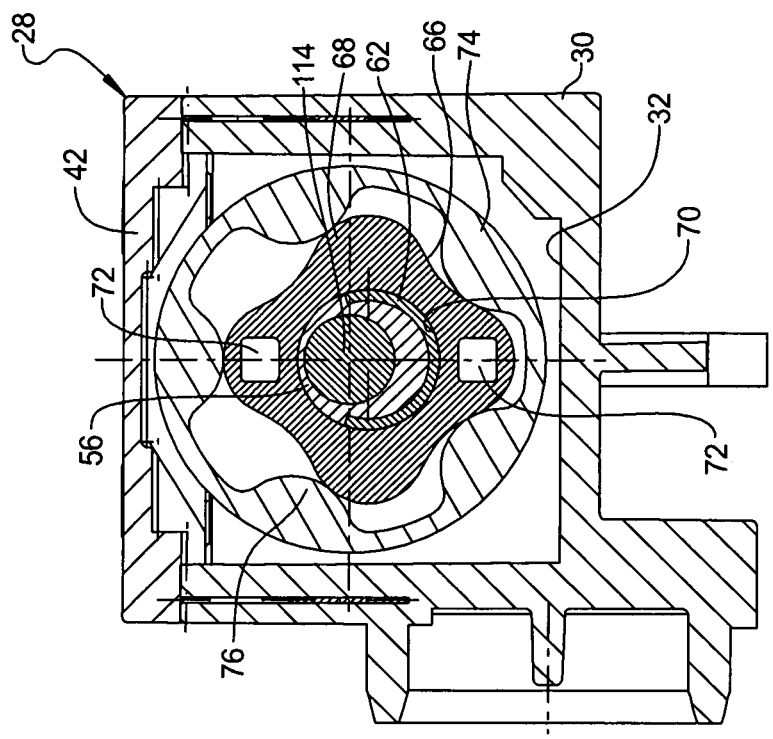
FIG. 11 is a sectional view taken along line B-B of FIG. 5 and illustrating an eccentric position at one hundred eighty degrees of operation.
Figure 10:
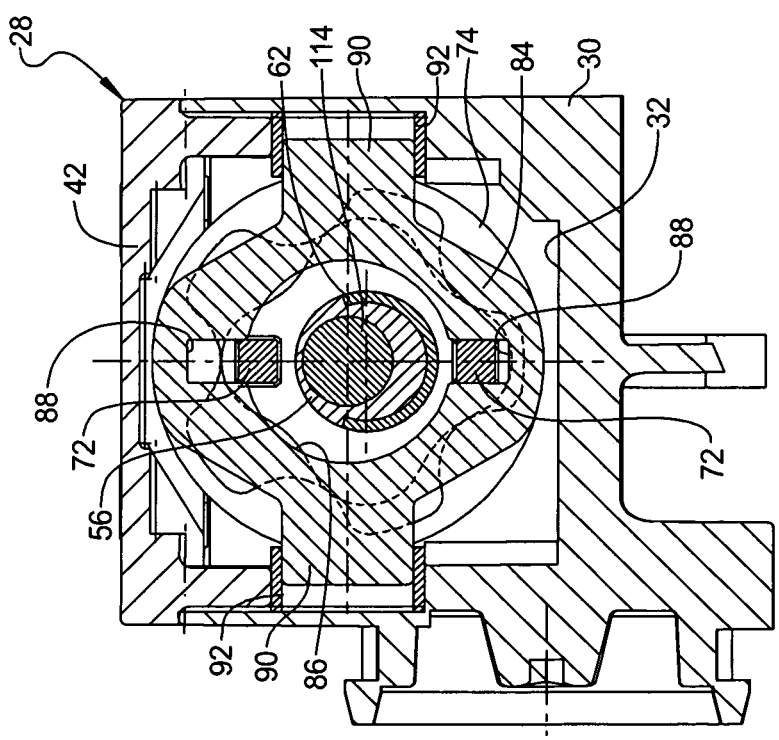
FIG. 10 is a sectional view taken along line A-A of FIG. 5 and illustrating an eccentric position at one hundred eighty degrees of operation.
Figure 12:
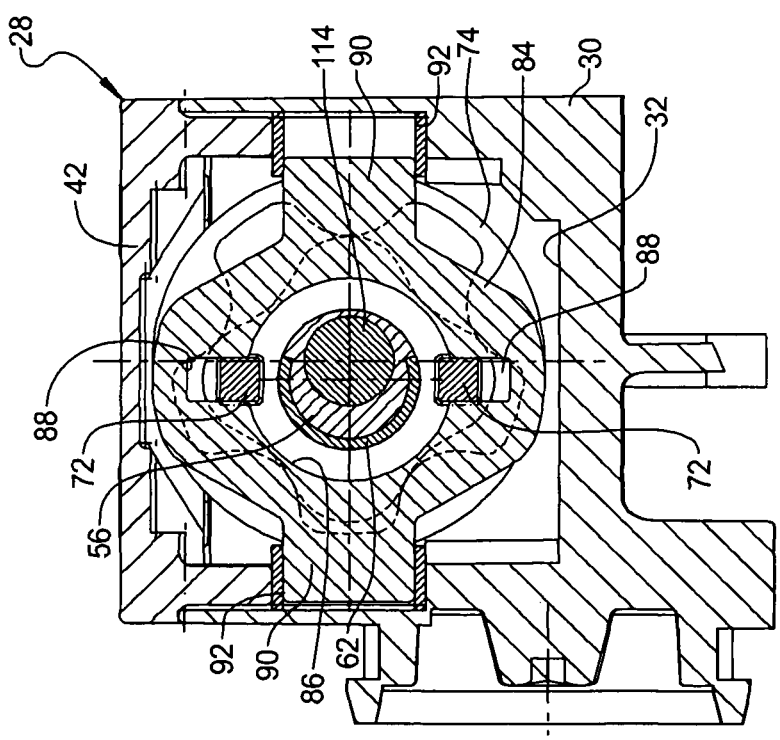
FIG. 12 is a sectional view taken along line A-A of FIG. 5 and illustrating an eccentric position at two hundred seventy degrees of operation.
Figure 13:
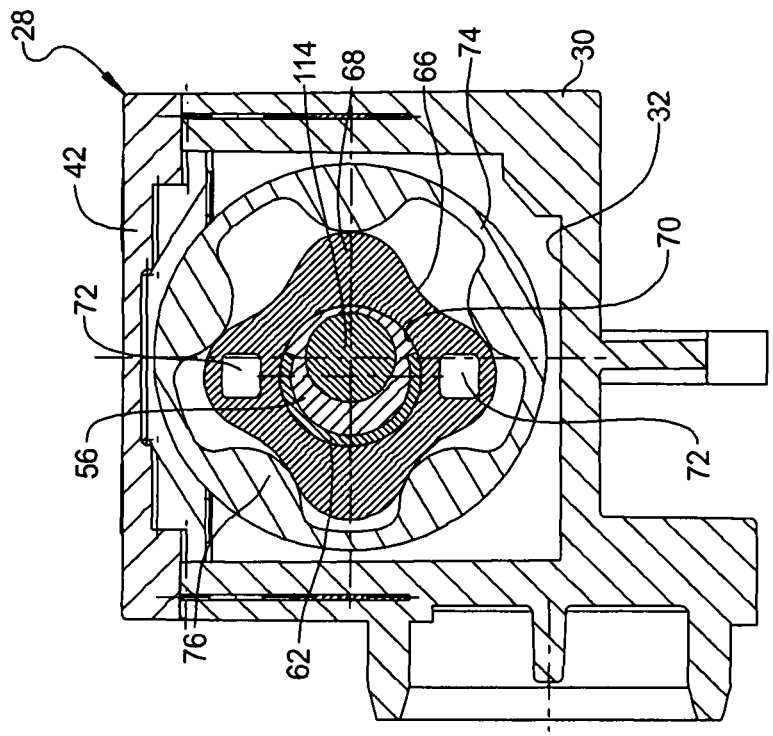
FIG. 13 is a sectional view taken along line B-B of FIG. 5 and illustrating an eccentric position at two hundred seventy degrees of operation.
Figure 14:
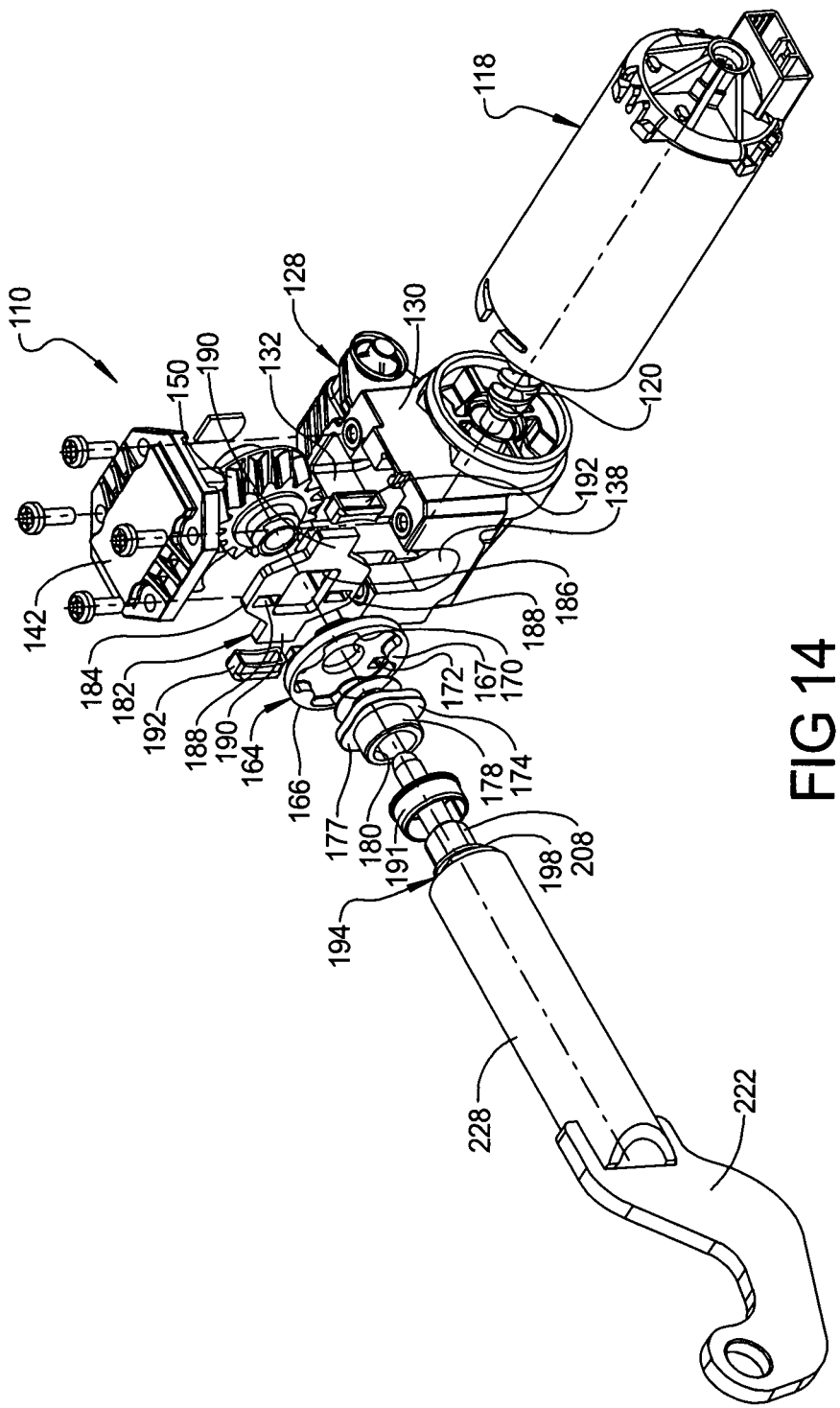
FIG. 14 is an exploded perspective view of another embodiment, according to the present invention, of the power seat height adjuster mechanism of FIG. 1.

Referring to FIGS. 4 through 13, the operation of the power seat height adjuster mechanism 10 is shown. As illustrated in FIG. 5, the double stage speed reduction mechanism 28 has a speed reduction ratio of $it=i12 \times is4$, wherein $i12=z2/z1$, is the first stage (worm-worm gear drive) speed reduction ratio and $is4=-z4/(z4-z3)$, is the second stage (cyclo-planetary gear drive) speed reduction ratio. In the above relations $z1$, $z2$, $z3$ and z4 represent the number of starts of the worm, the number of teeth of the worm gear (helical gear), the number of teeth (external lobes) of the driving planetary gear 66 and the number of teeth (internal lobes) of the driven planetary gear 74, respectively. The minus sign (−), in the expression of the second stage speed reduction ratio shows that the direction of rotation of the driven planetary gear 74 is opposed to the direction of rotation of driven worm gear (helical gear).

As illustrated in FIGS. 5 through 13, in operation, upon activation of a switch (not shown) by a person (not shown), power is supplied to the motor 18. The motor 18 rotates the worm shaft 20 to rotate the helical gear 50. Rotation of the helical gear 50 causes the eccentric plate 62 to rotate, in turn, forcing the eccentric driving planetary gear 66 in a wobbling motion around the worm gear (helical gear) axis. During this plan parallel motion, the two opposed projections 72 formed on the eccentric driving planetary gear slide up and down (Y-direction) in the opposed slots 88 of the locking plate 84. As an X-Y shifter, the locking plate 84 is disposed in the housing in adjacent parallel relationship to the driving and driven planetary gears. At the same time the locking plate 84 moves laterally or sideways back and forth, in the X-direction, the two arms 90 sliding in the locking plate supports 92, secured into the housing cavity 32 through the cover 42. This double guidance is intended to prevent rotation of the eccentric planetary driving gear and at the same time to enable this wobbling motion; that is, to enable the superposition of two directions of motion that are perpendicular to one another. The inner driving planetary gear 66 is provided with a series of external teeth (lobes) 68 adapted to mate with internal teeth (lobes) 76 of the driven planetary gear 74. These teeth may be of standard involute form or they may be specially designed (cycloidal form). Thus, the wobbling motion of the eccentric driving planetary gear 66 causes a uniform output rotation of the driven planetary gear 74 in a speed reduction ratio determined by the difference between the numbers of teeth of the two planetary gears. Obviously, the closer in number of teeth between the respective planetary gears, the greater the speed reduction ratio. As illustrated, the driven planetary gear 74 is coupled to the spindle screw 108, causing the spindle screw 108 to rotate. Rotation of the spindle screw 108 causes the spindle nut 98, supporting tube 128, and hook member 122 to translate linearly as a unit to rotate the adjuster component 16 and adjust the vertical position of the seat portion of the seat 12.

When the seat 12 is adjusted vertically to its desired position, the switch is disengaged by the person and power is discontinued to the motor 18. Due to the load on the seat 12 and vibrations of the vehicle, the spindle nut 98 will attempt to rotate the spindle screw 108 in the opposite direction along with the driven planetary gear 74. The attempted rotation of the driven planetary gear 74 acts on the driving planetary gear 66. This attempted rotation motion of the driving planetary gear 66 tries to further rotate the locking plate 84, which is secured in the housing against any rotation attempt. As a result, no further movement is transmitted through the speed reduction mechanism 28 via the helical gear 50 to the motor 18 and the seat 12 remains in the adjusted position. It should be appreciated that the locking mechanism 82 prevents reverse rotation of the worm shaft 20, thereby preventing a drop in height of the seat portion of the seat 12.

Referring to FIGS. 14 through 23, another embodiment, according to the present invention, of the power seat height adjuster mechanism 10 is shown. Like parts have like reference numerals increased by one hundred (100). In this embodiment, the power seat height adjuster mechanism 110 includes the motor 118, speed reduction mechanism 128, planetary gear drive 164, locking mechanism 182, and nut drive mechanism 194. It should be appreciated that the planetary gear drive 164 is a cycloidal planetary gear drive.

The planetary gear drive 164 includes a driving planetary gear 166 having inner teeth (lobes) 167. The driving planetary gear 166 has a central aperture 170 extending therethrough and a pair of opposed projections 172 spaced from the aperture 170 and extending axially. The planetary gear drive 164 also includes a driven planetary gear 174 having outer teeth (lobes) 177. The driven planetary gear 174 has an annular front portion 178 disposed in the recess 138 of the gearbox housing 130. The driven planetary gear 174 has an aperture 180 extending axially through the front portion 178 and therethrough for a function to be described. The planetary gears 166 and 174 are made of metal material and are either stamped and/or sintered. It should be appreciated that the speed reduction mechanism 128 has a first stage reduction made up of worm-worm gear drive (worm-helical gear drive) and a second stage reduction made up of the planetary gear drive 164.

The locking mechanism 182 includes a locking plate 184 disposed in the cavity 132 of the gearbox 130. The locking plate 184 has a central aperture 186 extending therethrough and a pair of opposed slots 188 spaced from the aperture 186 extending therethrough to receive the projections 172. The slots 188 are offset radially or laterally from a central axis of the aperture 186. The central aperture 186 is generally rectangular in shape. The locking plate 184 also includes an opposed pair of arms 190 extending radially and having a generally rectangular shape for a function to be described. The locking plate 184 is made of a metal material. The locking mechanism 182 also includes at least one, preferably a pair of locking plate supports 192 disposed in the cavity 132 between the cover 142 and the gearbox housing 130 and cooperating with the locking plate 184. The locking plate supports 192 are generally hollow and rectangular in shape with one locking plate support 192 receiving one of the arms 190 of the locking plate 184. The locking plate supports 192 are made of a plastic material. It should be appreciated that the locking mechanism 182 provides decomposition of wobbling motion on two perpendicular directions.

The power seat height adjuster mechanism 110 includes a bearing bushing 191 disposed about the front portion 178 of the driven planetary gear 174. The bearing bushing 191 is disposed in the recess 138 of the gearbox housing 130. The bearing bushing 191 is made of a metal material.

Figure 15:
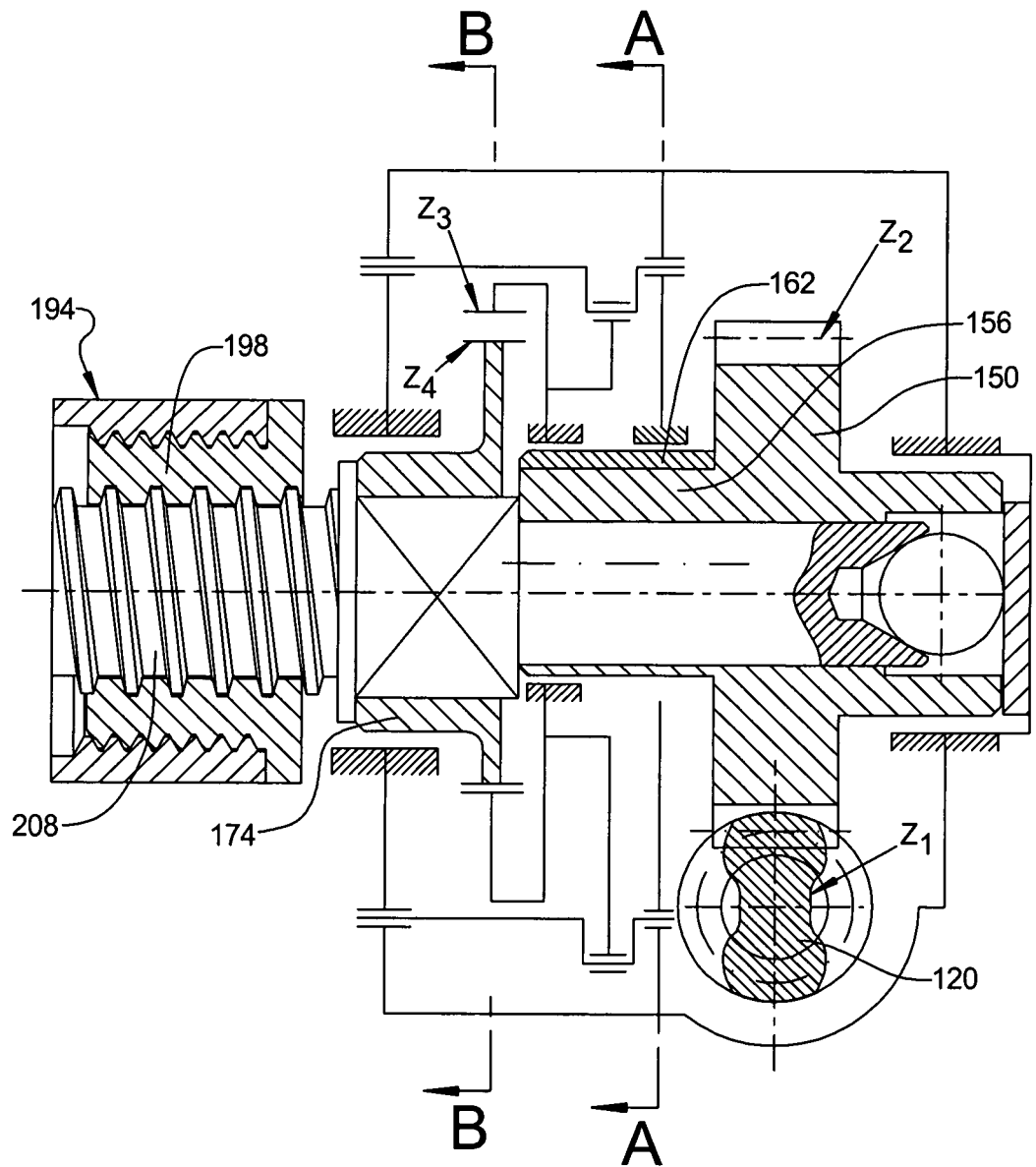
FIG. 15 is a diagrammatic view of the power seat height adjuster mechanism of FIG. 14.
Figure 17:
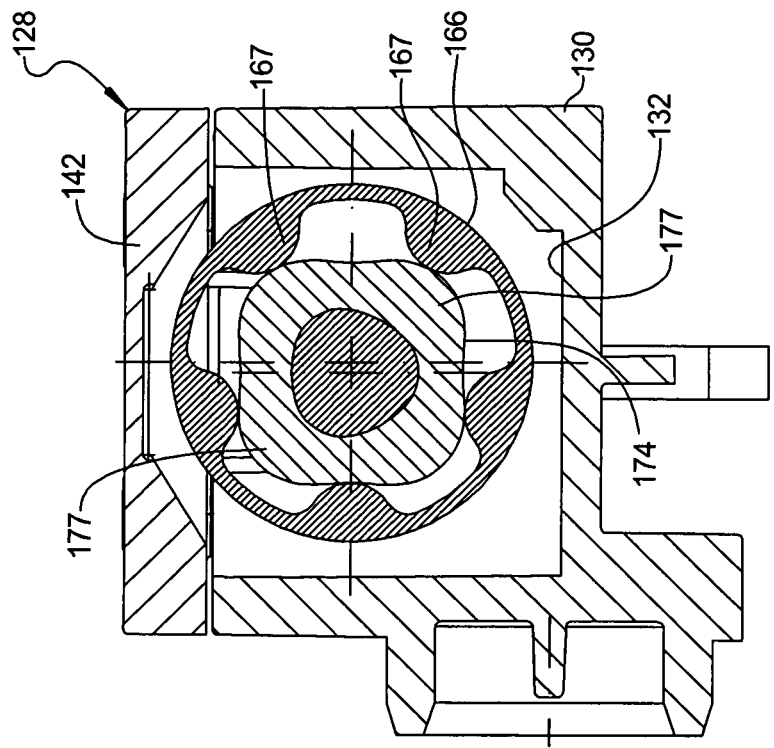
FIG. 17 is a sectional view taken along line B-B of FIG. 15 and illustrating an eccentric position at zero degrees of operation.
Figure 16:
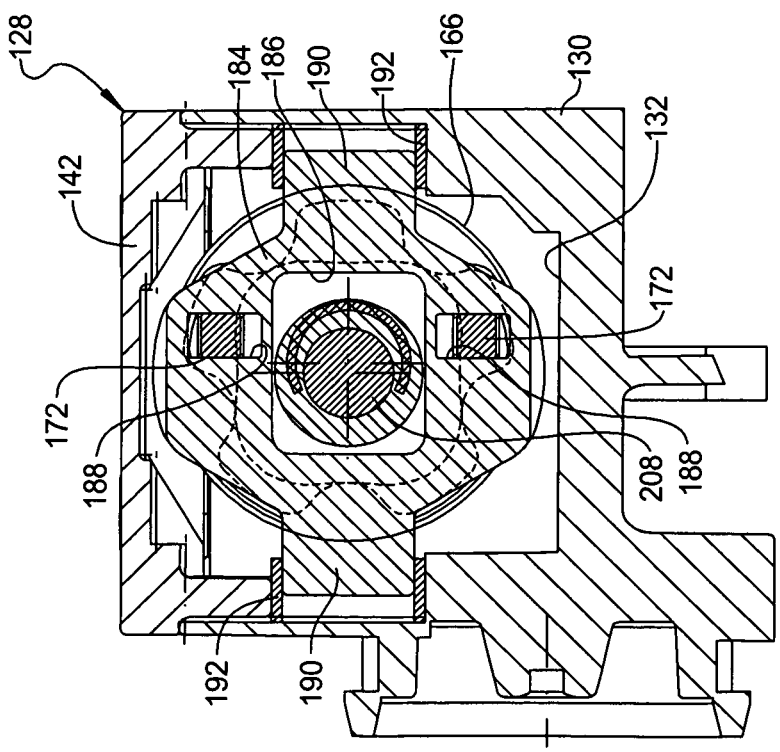
FIG. 16 is a sectional view taken along line A-A of FIG. 15 and illustrating an eccentric position at zero degrees of operation.
Figure 19:
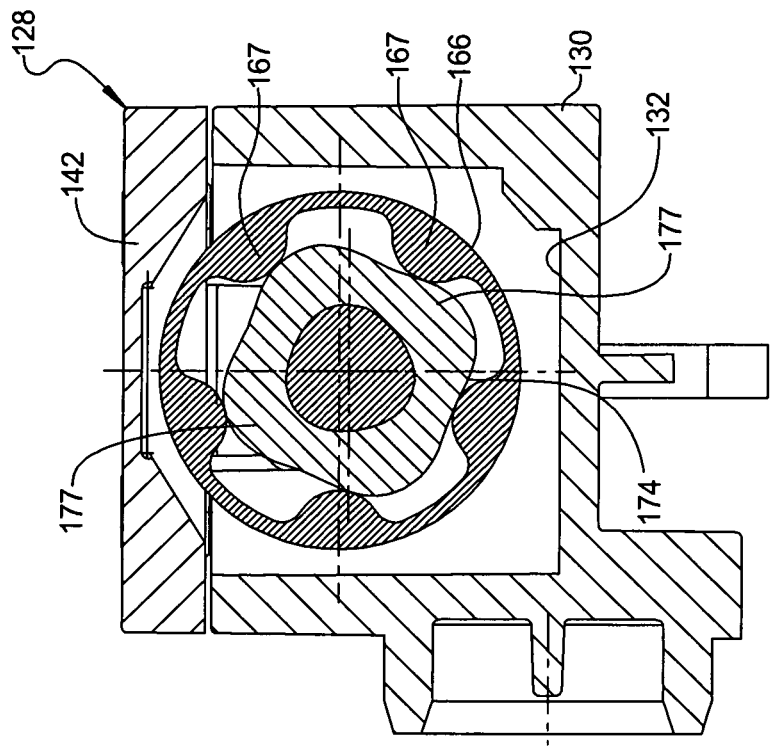
FIG. 19 is a sectional view taken along line B-B of FIG. 15 and illustrating an eccentric position at ninety degrees of operation.
Figure 18:
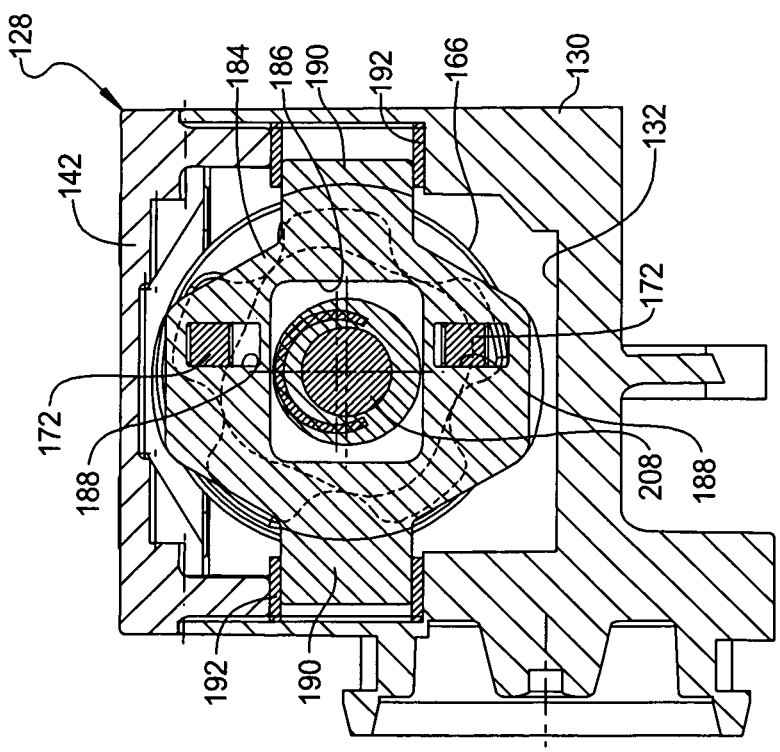
FIG. 18 is a sectional view taken along line A-A of FIG. 15 and illustrating an eccentric position at ninety degrees of operation.
Figure 21:
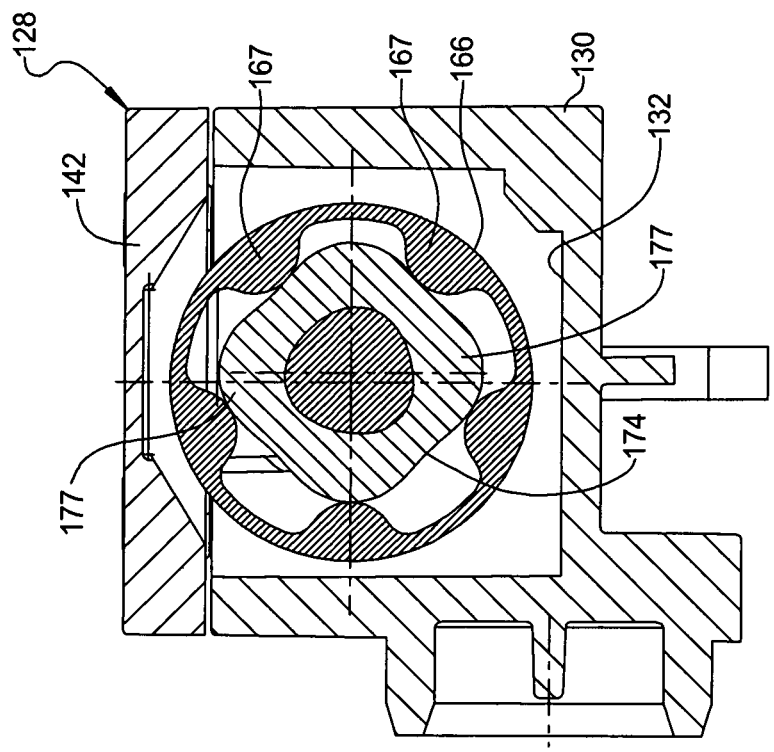
FIG. 21 is a sectional view taken along line B-B of FIG. 15 and illustrating an eccentric position at one hundred eighty degrees of operation.
Figure 20:
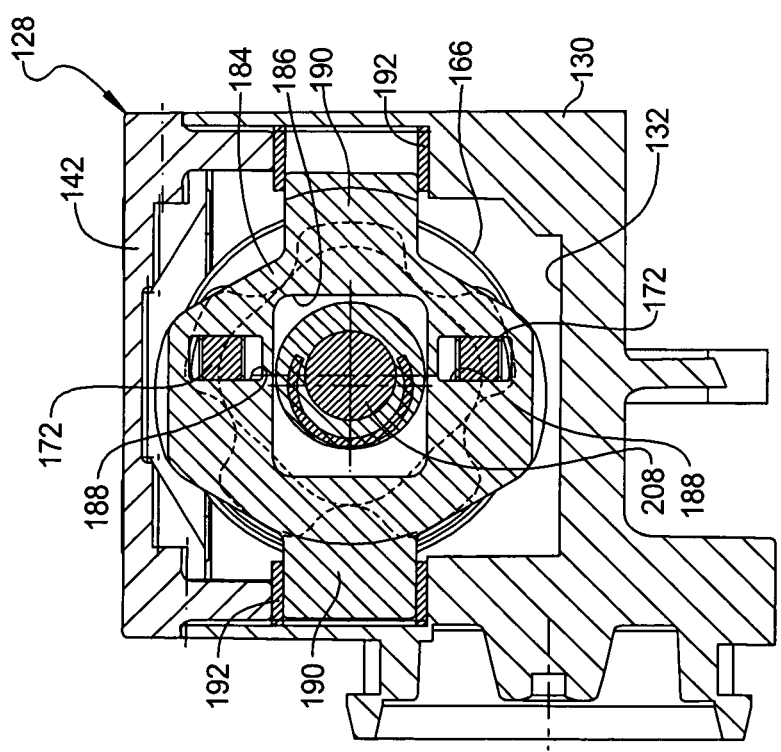
FIG. 20 is a sectional view taken along line A-A of FIG. 15 and illustrating an eccentric position at one hundred eighty degrees of operation.
Figure 23:
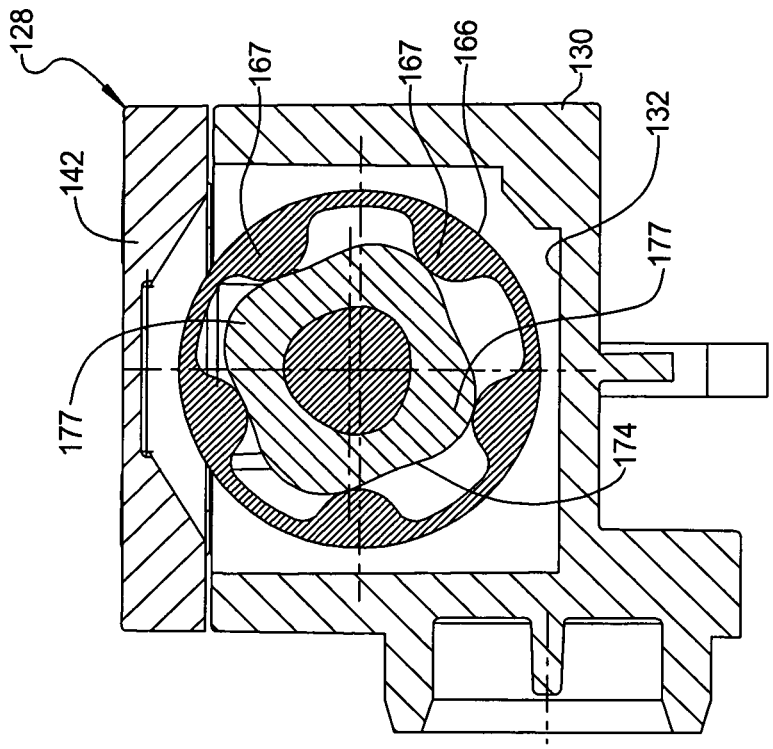
FIG. 23 is a sectional view taken along line B-B of FIG. 15 and illustrating an eccentric position at two hundred seventy degrees of operation.
Figure 22:
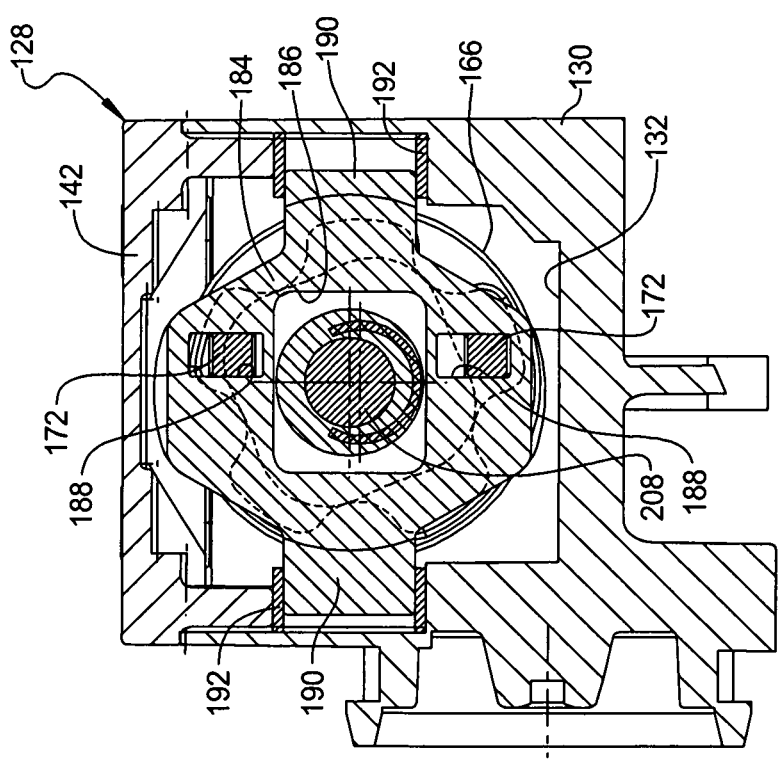
FIG. 22 is a sectional view taken along line A-A of FIG. 15 and illustrating an eccentric position at two hundred seventy degrees of operation.
Figure 24:
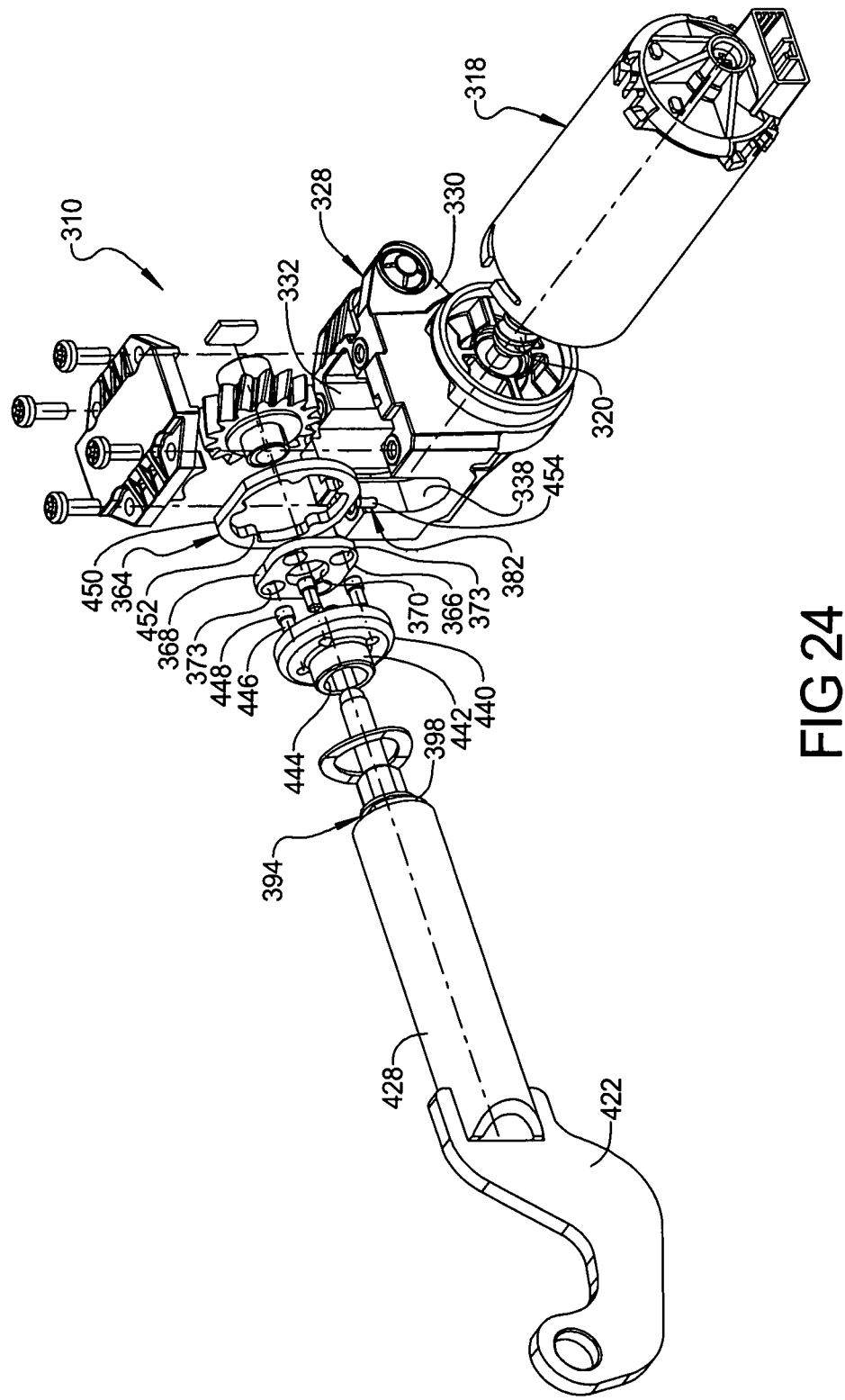
FIG. 24 is an exploded perspective view of yet another embodiment, according to the present invention, of the power seat height adjuster mechanism of FIG. 1.

Referring to FIGS. 14 through 23, the operation of the power seat height adjuster mechanism 110 is shown. As illustrated in FIG. 15, the double stage speed reduction mechanism 128 has a speed reduction ratio of it=i12×is4, wherein i12=z2/z1, is the first stage (worm-worm gear drive) speed reduction ratio and is4=−z4/(z3−z4), is the second stage (cyclo-planetary gear drive) speed reduction ratio. In the above relations z1, z2, z3 and z4 represent the number of starts of the worm, the number of teeth of the worm gear (helical gear), the number of teeth (internal lobes) of the driving planetary gear 166 and the number of teeth (external lobes) of the driven planetary gear 174, respectively. The minus sign (−), in the expression of the second stage speed reduction ratio shows that the direction of rotation of the driven planetary gear 174 is opposed to the direction of rotation of driven worm gear (helical gear).

As illustrated in FIGS. 15 through 23, in operation, upon activation of a switch (not shown) by a person (not shown), power is supplied to the motor 118. The motor 118 rotates the worm shaft 120 to rotate the helical gear 150. Rotation of the helical gear 150 causes the eccentric plate 162 to rotate, in turn, forcing the eccentric driving planetary gear 166 in a wobbling motion around the worm gear (helical gear) axis. During this plan parallel motion, the two opposed projections 172 formed on the eccentric driving planetary gear slide up and down (Y-direction) in the opposed slots 188 of the locking plate 184. As an X-Y shifter, the locking plate 184 is disposed in the housing 130 in adjacent parallel relationship to the driving and driven planetary gears. At the same time the locking plate 184 moves laterally or sideways back and forth, in the X-direction, the two arms 190 sliding in the locking plate supports 192, secured into the housing cavity 132 through the cover 142. This double guidance is intended to prevent rotation of the eccentric driving planetary gear 166 and in the same time to enable this wobbling motion; that is, to enable the superposition of two directions of motion that are perpendicular to one another. The driving planetary gear 166 is provided with a series of internal teeth (lobes) 167 adapted to mate with external teeth (lobes) 177 of the driven planetary gear 174. These teeth may be of standard involute form or they may be specially designed (cycloidal form). Thus, the wobbling motion of the eccentric driving planetary gear 166 causes a uniform output rotation of the driven planetary gear 174 in a speed reduction ratio determined by the difference between the numbers of teeth of the two planetary gears. It should be appreciated that the closer in number of teeth between the respective planetary gears, the greater the speed reduction ratio. As illustrated, the driven planetary gear 174 is coupled to the spindle screw 208, causing the spindle screw 208 to rotate. Rotation of the spindle screw 208 causes the spindle nut 198, supporting tube 228, and hook member 222 to translate linearly as a unit to rotate the adjuster component 16 and adjust the vertical position of the seat portion of the seat 12.

When the seat 12 is adjusted vertically to its desired position, the switch is disengaged by the person and power is discontinued to the motor 118. Due to the load on the seat 12 and vibrations of the vehicle, the spindle nut 198 will attempt to rotate the spindle screw 208 in the opposite direction along with the driven planetary gear 174. This attempted rotation motion of the driven planetary gear 174 tries to further rotate the locking plate 184, which is secured in the housing 130 against any rotation attempt. As a result, no further movement is transmitted through the speed reduction mechanism 128 to the motor 118 and the seat 12 remains in the adjusted position. It should be appreciated that the locking mechanism 182 prevents reverse rotation of the worm shaft 120, thereby preventing a drop in height of the seat portion of the seat 12.

Referring to FIGS. 24 through 33, yet another embodiment, according to the present invention, of the power seat height adjuster mechanism 10 is shown. Like parts have like reference numerals increased by three hundred (300). In this embodiment, the power seat height adjuster mechanism 310 includes the motor 318, speed reduction mechanism 328, cycloidal planetary gear drive 364, locking mechanism 382, and nut drive mechanism 394. It should be appreciated that the planetary gear drive 364 is a cycloidal planetary gear drive.

The planetary gear drive 364 includes a driving planetary gear 366 having outer teeth (lobes) 368. The driving planetary gear 366 has a central aperture 370 extending axially therethrough and a plurality of apertures 373 spaced from the aperture 370 with one aperture 373 through each tooth (lobe) 368. The apertures 373 are generally circular in shape. The planetary gear drive 364 also includes a driven hub 440. The driven hub 440 has an annular front portion 442 disposed in the recess 338 of the gearbox housing 330. The driven hub 440 has an aperture 444 extending axially through the front portion 442 and therethrough. The driven hub 440 has a plurality of projections or pins 446 spaced from the aperture 170 and extending axially. One of the pins 446 extends through one of the apertures 373 in the driving planetary gear 366. The cycloidal planetary gear drive 364 includes a plurality of rollers 448 cooperating with the pins 446 and apertures 373. One of the rollers 448 is disposed about one of the pins 446.

The planetary gear drive 364 includes a stationary planetary gear 450 having inner teeth (lobes) 452. The planetary gear 450 is disposed in the cavity 332 of the gearbox housing 330. It should be appreciated that the speed reduction mechanism 328 has a first stage reduction made up of worm-worm gear drive (worm-helical gear drive) and a second stage reduction made up of the planetary gear drive 364.

The locking mechanism 382 includes the planetary gear 450 and a locking pin 454 disposed in an aperture 455 of both the planetary gear 450 and the gearbox housing 130. The locking pin 454 is made of a metal material. It should be appreciated that the locking mechanism 382 is a self-locking cycloid gear.

Figure 25:
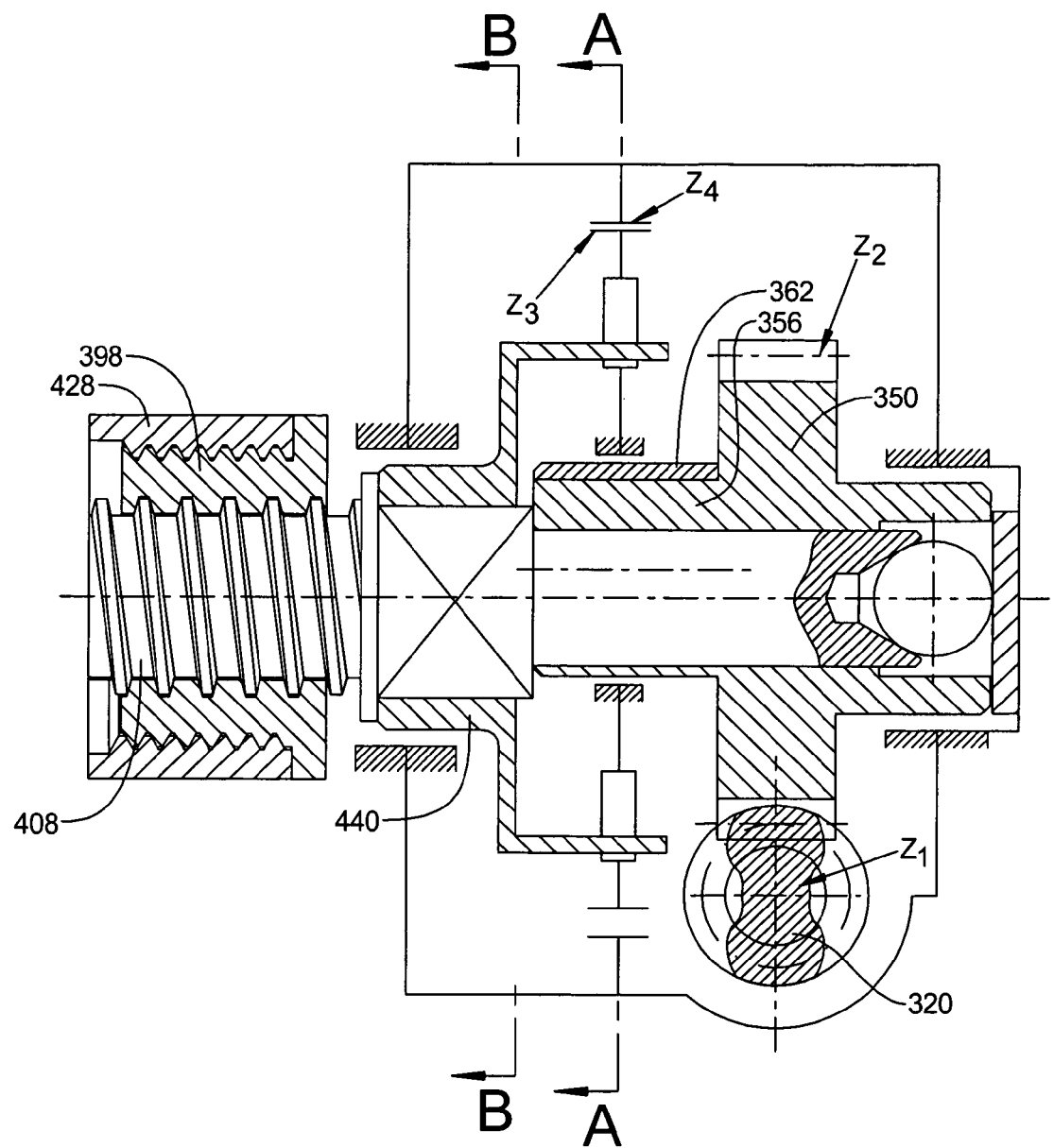
FIG. 25 is a diagrammatic view of the power seat height adjuster mechanism of FIG. 24.
Figure 27:
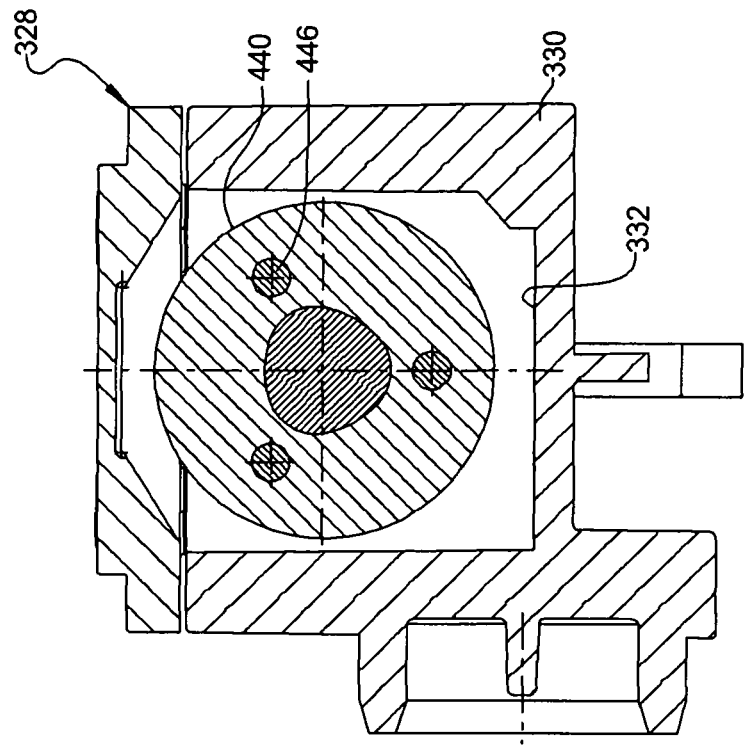
FIG. 27 is a sectional view taken along line B-B of FIG. 25 and illustrating an eccentric position at zero degrees of operation.
Figure 26:
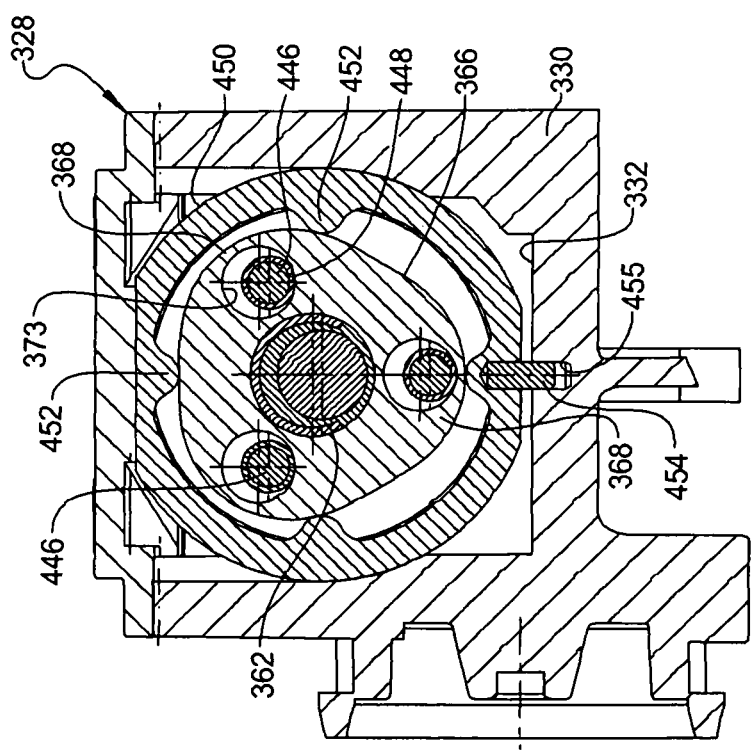
FIG. 26 is a sectional view taken along line A-A of FIG. 25 and illustrating an eccentric position at zero degrees of operation.
Figure 31:
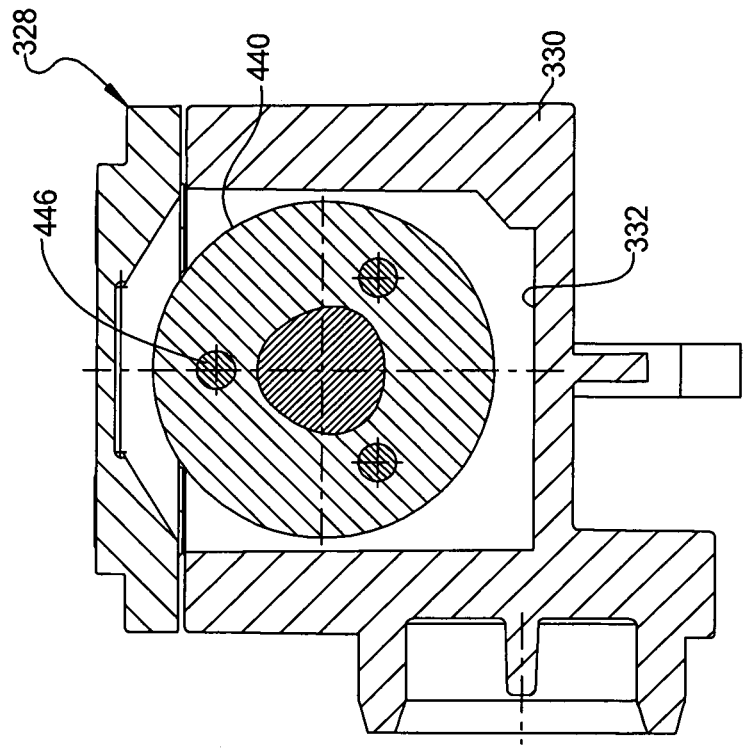
FIG. 31 is a sectional view taken along line B-B of FIG. 25 and illustrating an eccentric position at one hundred eighty degrees of operation.
Figure 30:
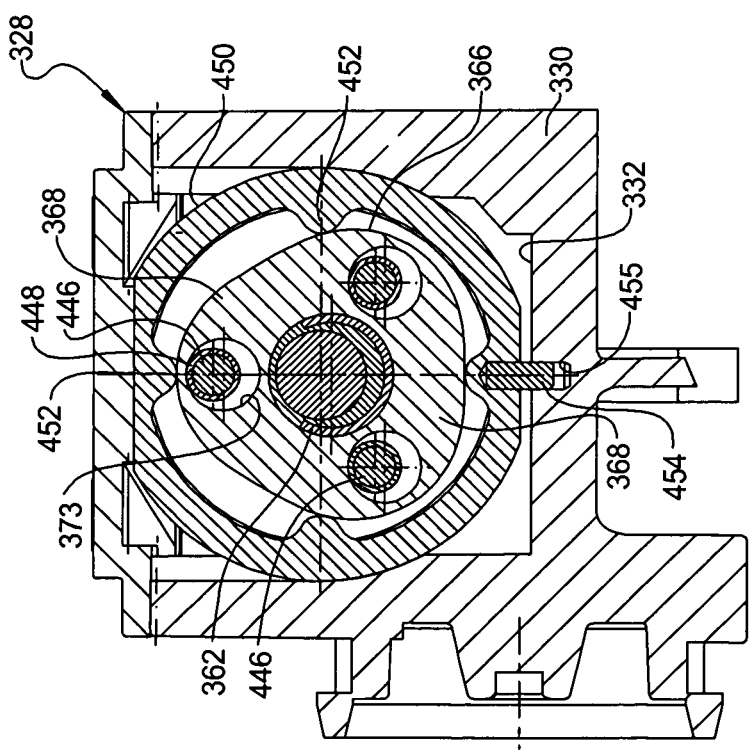
FIG. 30 is a sectional view taken along line A-A of FIG. 25 and illustrating an eccentric position at one hundred eighty degrees of operation.
Figure 33:
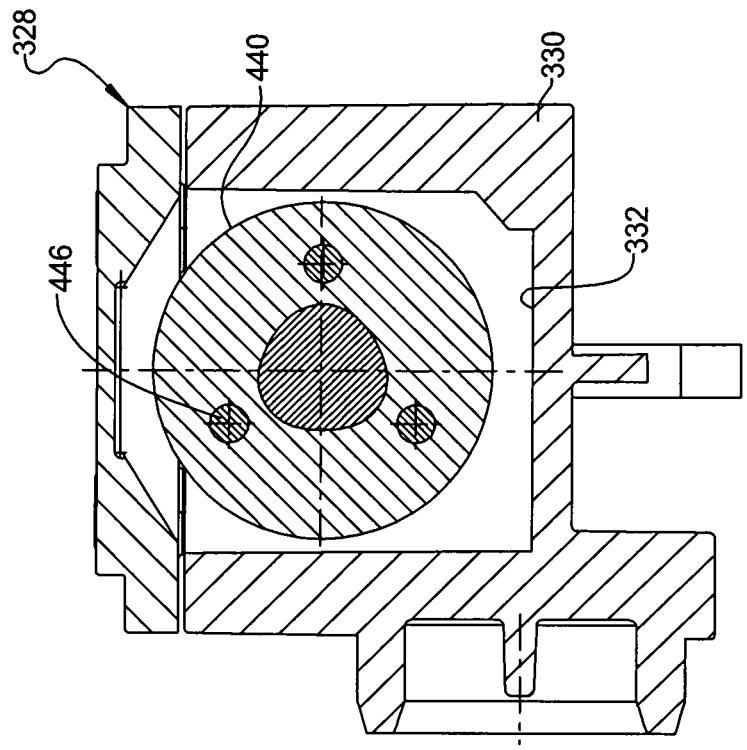
FIG. 33 is a sectional view taken along line B-B of FIG. 25 and illustrating an eccentric position at two hundred seventy degrees of operation.
Figure 32:
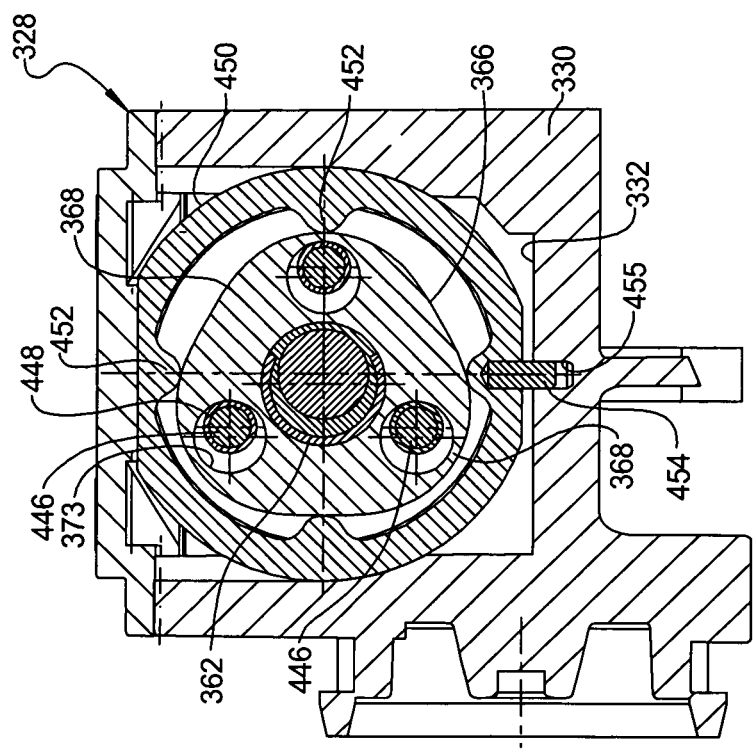
FIG. 32 is a sectional view taken along line A-A of FIG. 25 and illustrating an eccentric position at two hundred seventy degrees of operation.
Figure 34:
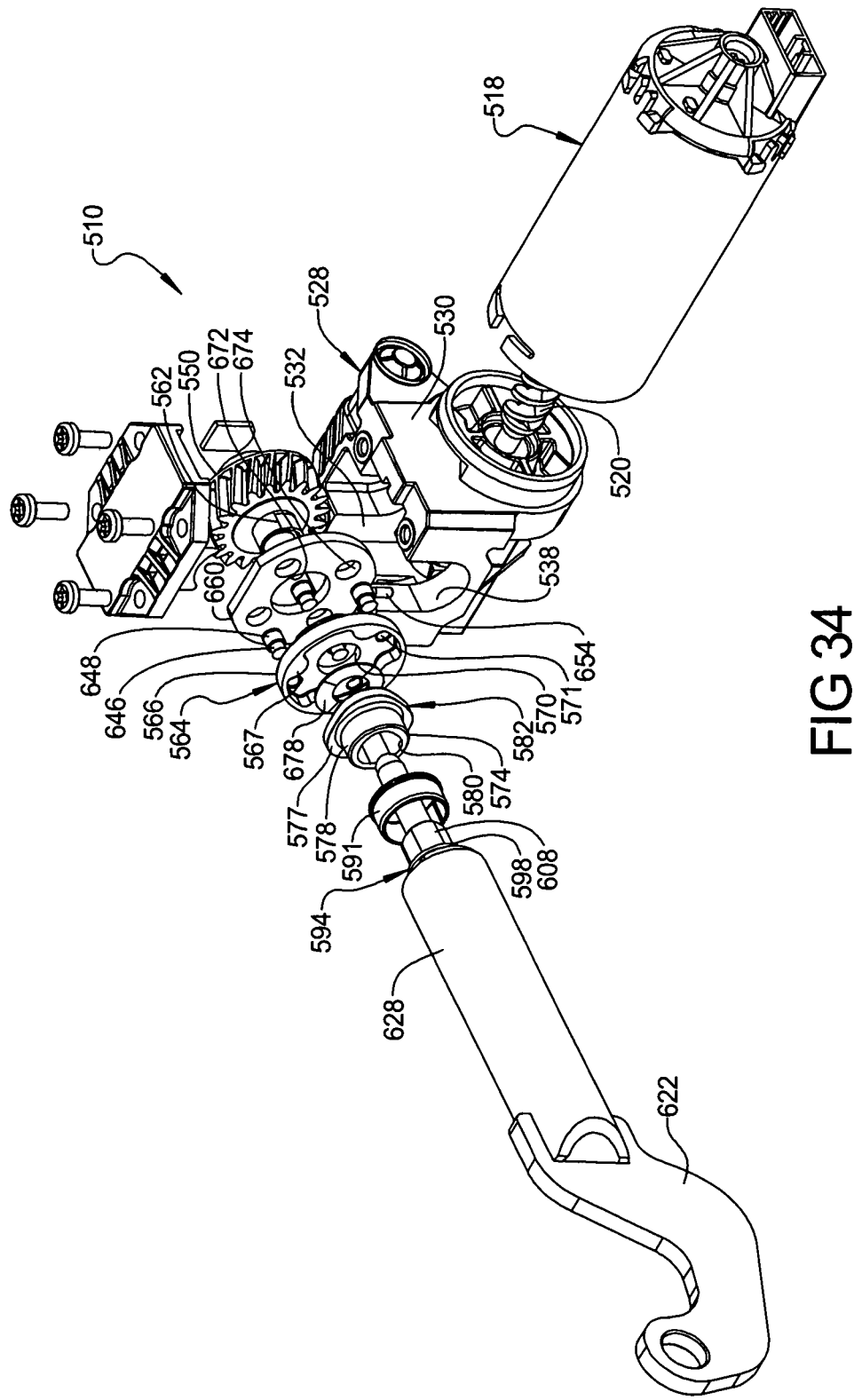
FIG. 34 is an exploded perspective view of still another embodiment, according to the present invention, of the power seat height adjuster mechanism of FIG. 1.

Referring to FIGS. 24 through 33, the operation of the power seat height adjuster mechanism 310 is shown. As illustrated in FIG. 25, the double stage speed reduction mechanism 328 has a speed reduction ratio of $i_t = i_{12} \times i_{s3}$, wherein $i_{12} = z_2/z_1$, is the first stage (worm-worm gear drive) speed reduction ratio and $i_{s3} = -z_3/(z_4 - z_3)$, is the second stage (cyclo-planetary gear drive) speed reduction ratio. In the above relations $z_1$, $z_2$, $z_3$ and $z_4$ represent the number of starts of the worm, the number of teeth of the worm gear (helical gear), the number of teeth (external lobes) of the driving planetary gear 366 and the number of teeth (internal lobes) of the stationary planetary gear 450, respectively. The minus sign (−), in the expression of the second stage speed reduction ratio shows that the direction of rotation of the driven hub 440 is opposed to the direction of rotation of driven worm gear (helical gear).

As illustrated in FIGS. 25 through 33, in operation, upon activation of a switch (not shown) by a person (not shown), power is supplied to the motor 318. The motor 318 rotates the worm shaft 320 to rotate the helical gear 350. Rotation of the helical gear 350 causes the eccentric plate 362 to rotate and move the driving planetary gear 366 within the stationary planetary gear 450 in such a way that its pitch circle rolls within the larger stationary pitch circle of stationary gear 450. Thus, a point on the rolling pitch circle traces an hypocycloid whose cusps are separated along the arc of the stationary pitch circle by a distance equal to difference of circumferences of the two pitch circles. Every full rotation of the helical gear 350 gives the center of the rolling planetary gear 366 a primary motion in one direction about a circle whose center is on the helical gear 350 axis and whose radius is the eccentricity of the driving eccentric plate 362, and this is accompanied by a secondary motion of retardation or counter-rotation through an arc whose length is equal to the difference of the pitch circumferences. The meshing of the teeth 368 and 452 ensures hypocyclic action, without slipping, thus providing an exact ratio of reduction between the angular rotation of the helical gear 350 and the secondary rotation of the driving planetary gear 366. The total motion of the driving planetary gear 366 is a combination of the primary and secondary motions, and these are transformed into the steady rotation of the driven hub 440, coaxial with the helical gear 350, in its bearing recess 338 by a set of elementary four-bar linkages operating together. Each of these links are connecting the driven hub 440 with the driving planetary gear 366 thru a pin 440 and a bushing 448 carried by the hub 440 that rotates into the circular opening 373 of the driving planetary gear 366.

Rotation of the spindle screw 408 causes the spindle nut 398, supporting tube 428, and hook member 422 to translate linearly as a unit to rotate the adjuster component 16 and adjust the vertical position of the seat portion of the seat 12.

When the seat 12 is adjusted vertically to its desired position, the switch is disengaged by the person and power is discontinued to the motor 318. Due to the load on the seat 12 and vibrations of the vehicle, the spindle nut 398 will attempt to rotate the spindle screw 408 in the opposite direction along with the driven hub 440. The attempted rotation of the driven hub 440 acts on the driving planetary gear 366. This attempted motion of the driving planetary gear 366 tries to move upwardly and rotate, but is prevented from movement due the stationary planetary gear 450. As a result, no further movement is transmitted through the speed reduction mechanism 328 to the motor 318 and the seat 12 remains in the adjusted position. It should be appreciated that the locking mechanism 382 prevents reverse rotation of the worm shaft 320, thereby preventing a drop in height of the seat portion of the seat 12.

Referring to FIGS. 34 through 43, still another embodiment, according to the present invention, of the power seat height adjuster mechanism 10 is shown. Like parts have like reference numerals increased by three hundred (500). In this embodiment, the power seat height adjuster mechanism 510 includes the motor 518, speed reduction mechanism 528, planetary gear drive 564, locking mechanism 582, and nut drive mechanism 594. It should be appreciated that the planetary gear drive 564 is a cycloidal planetary gear drive.

The planetary gear drive 564 includes a driving planetary gear 566 having inner teeth (lobes) 567. The driving planetary gear 566 has a central aperture 570 extending axially therethrough and a plurality of apertures 571 spaced from the aperture 570 and extending axially therethrough. The planetary gear drive 564 also includes a driven planetary gear 574 having outer teeth (lobes) 577. The driven planetary gear 574 has an annular front portion 578 disposed in the recess 538 of the gearbox housing 530. The driven planetary gear 574 has an aperture 580 extending through the front portion 578 and therethrough.

The planetary gear drive 564 also includes a stationary plate 660 disposed in the cavity 532 of the gearbox housing 530. The stationary plate 660 has a central aperture 662 extending therethrough and a plurality of apertures 664 spaced radially from the aperture 662 and extending axially therethrough. The apertures 664 are generally circular in shape. The planetary gear drive 564 includes a plurality of projections or pins 646 extending axially. One of the pins 646 extends through one of the apertures 571 in the driving planetary gear 566 and one of the apertures 664 in the stationary plate 660. The planetary gear drive 564 includes a plurality of rollers 648 cooperating with the pins 646 and apertures 664 in the stationary plate 660. One of the rollers 648 is disposed about one of the pins 646. It should be appreciated that the speed reduction mechanism 528 has a first stage reduction made up of worm-worm gear drive (worm-helical gear drive) and a second stage reduction made up of the planetary gear drive 564.

The locking mechanism 582 includes the stationary plate 660 and a locking pin 654 disposed in an aperture 655 of both the stationary plate 660 and the gearbox housing 530. The locking pin 654 is made of a metal material. It should be appreciated that the locking mechanism 582 is a self-locking cycloid gear.

The power seat height adjuster mechanism 510 includes a bearing bushing 591 disposed about the front portion 578 of the driven planetary gear 574. The bearing busing 591 is disposed in the recess 538 of the gearbox housing 530. The bearing bushing 591 is made of a metal material. The power seat height adjuster mechanism 510 also includes a wave washer 678 disposed about the spindle screw 608 and axially between the driving planetary gear 566 and the driven planetary gear 574. The wave washer 678 is made of a metal material. It should be appreciated that the wave washer 678 urges the driving planetary gear 566 axially toward the stationary plate 660.

Figure 35:
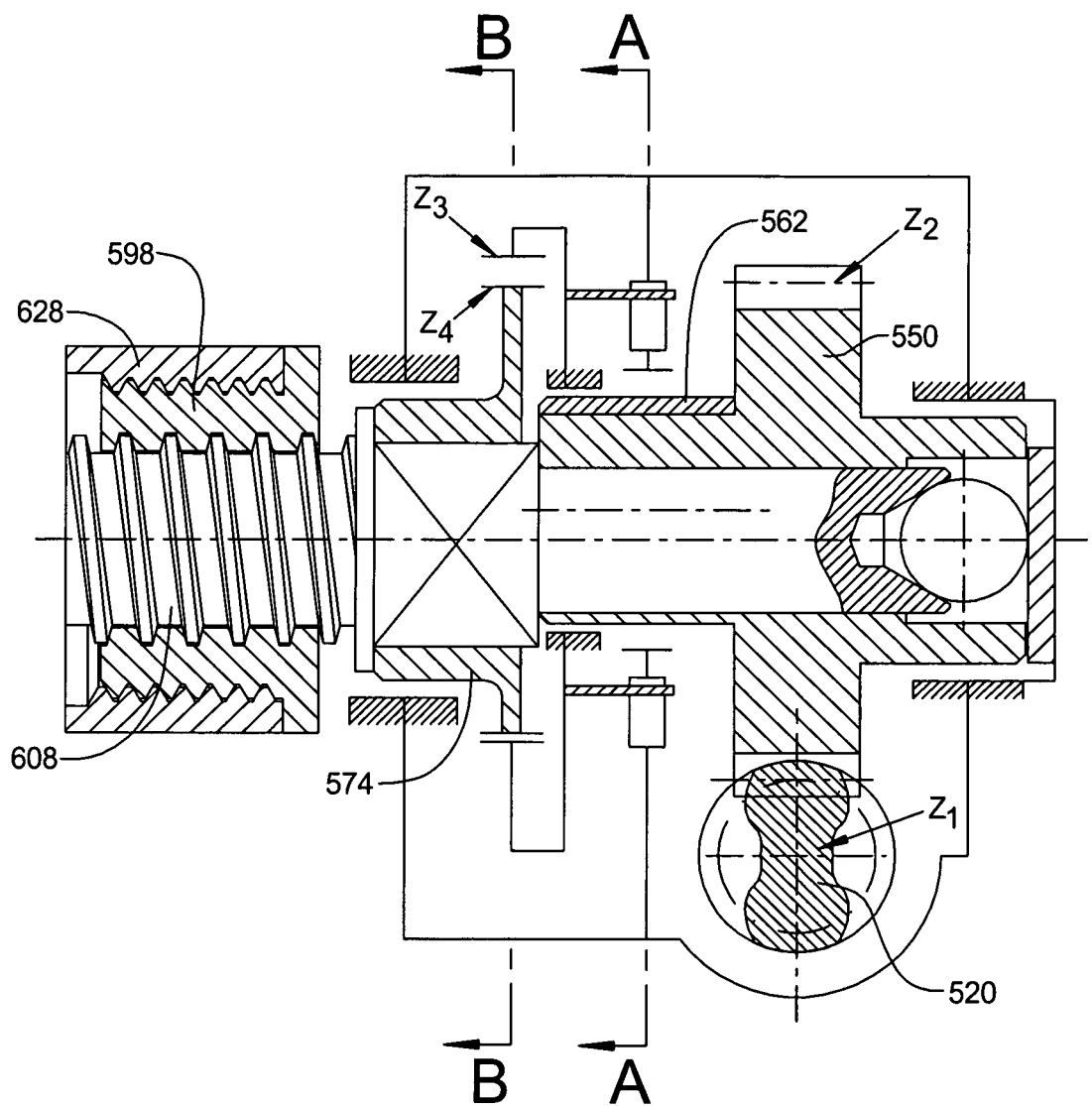
FIG. 35 is a diagrammatic view of the power seat height adjuster mechanism of FIG. 34.
Figure 37:
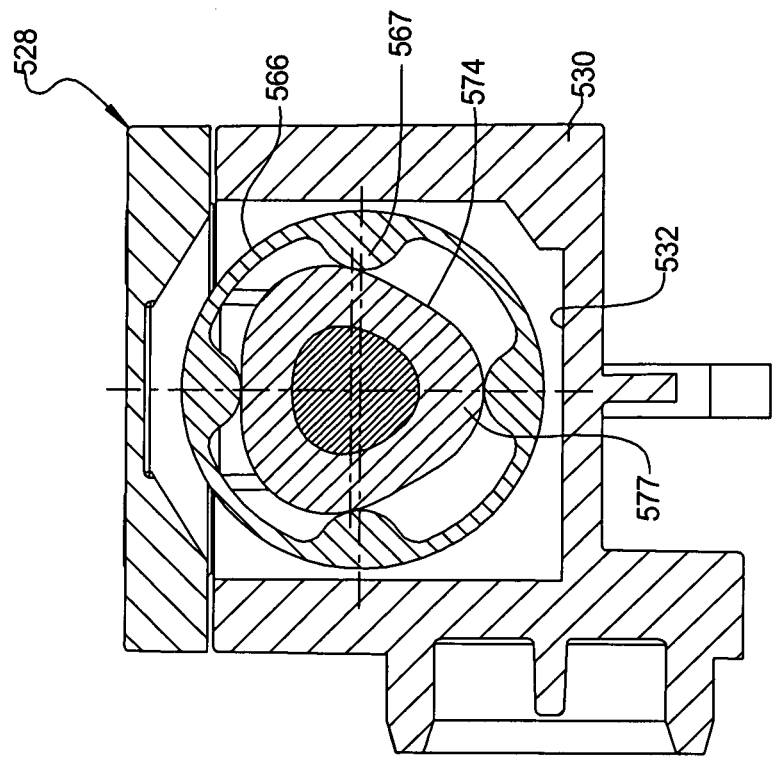
FIG. 37 is a sectional view taken along line B-B of FIG. 35 and illustrating an eccentric position at zero degrees of operation.
Figure 36:
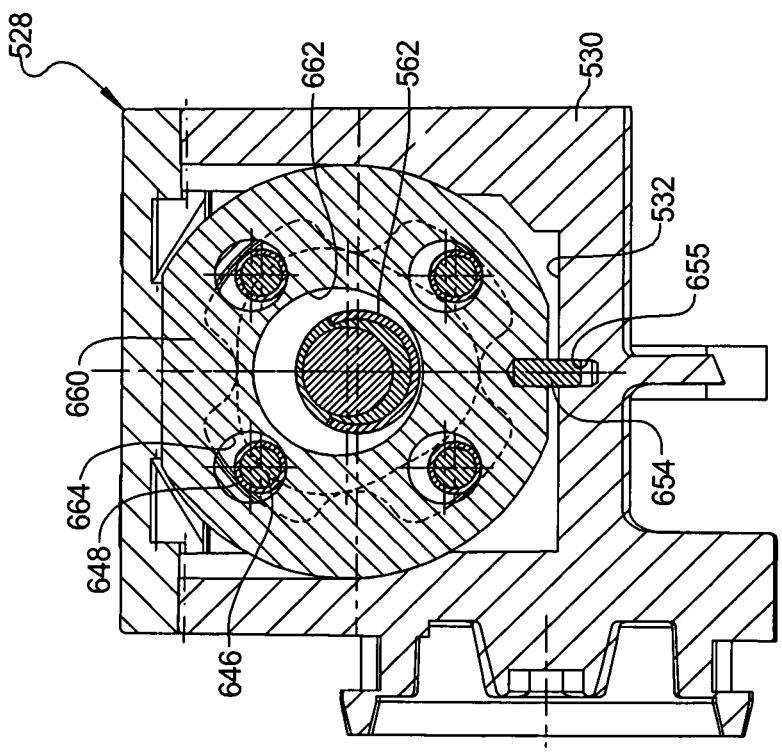
FIG. 36 is a sectional view taken along line A-A of FIG. 35 and illustrating an eccentric position at zero degrees of operation.
Figure 39:
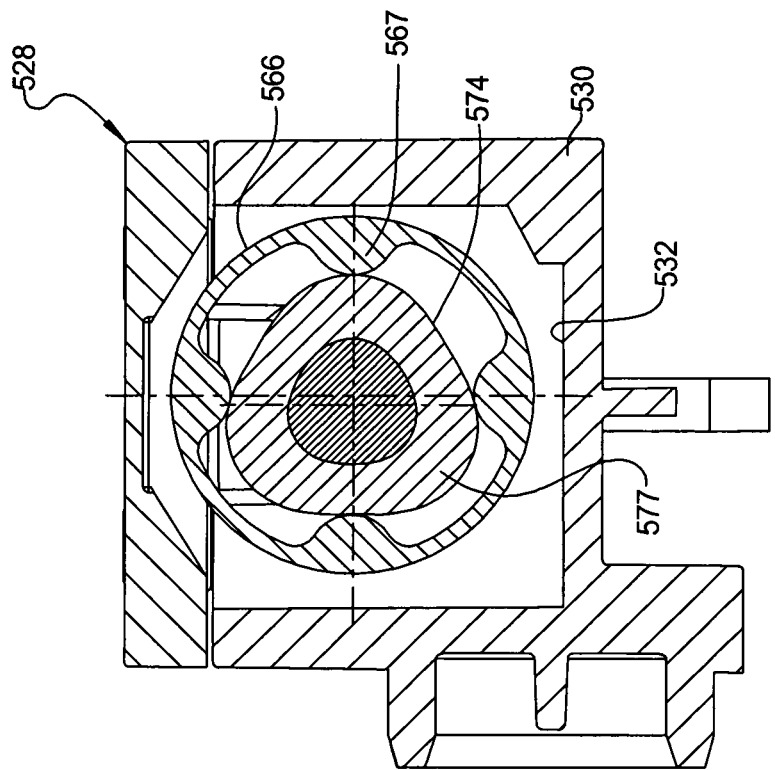
FIG. 39 is a sectional view taken along line B-B of FIG. 35 and illustrating an eccentric position at ninety degrees of operation.
Figure 38:
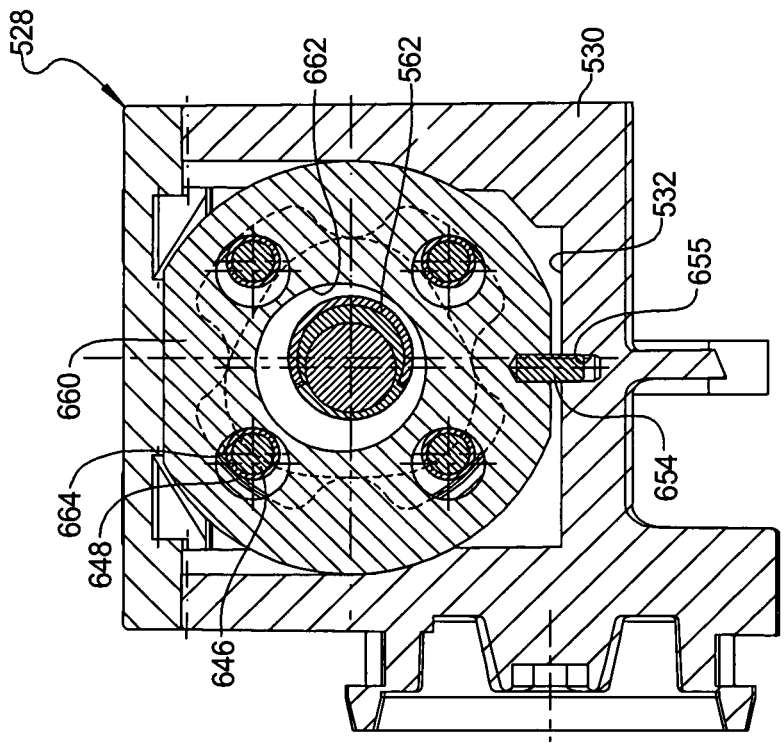
FIG. 38 is a sectional view taken along line A-A of FIG. 35 and illustrating an eccentric position at ninety degrees of operation.
Figure 41:
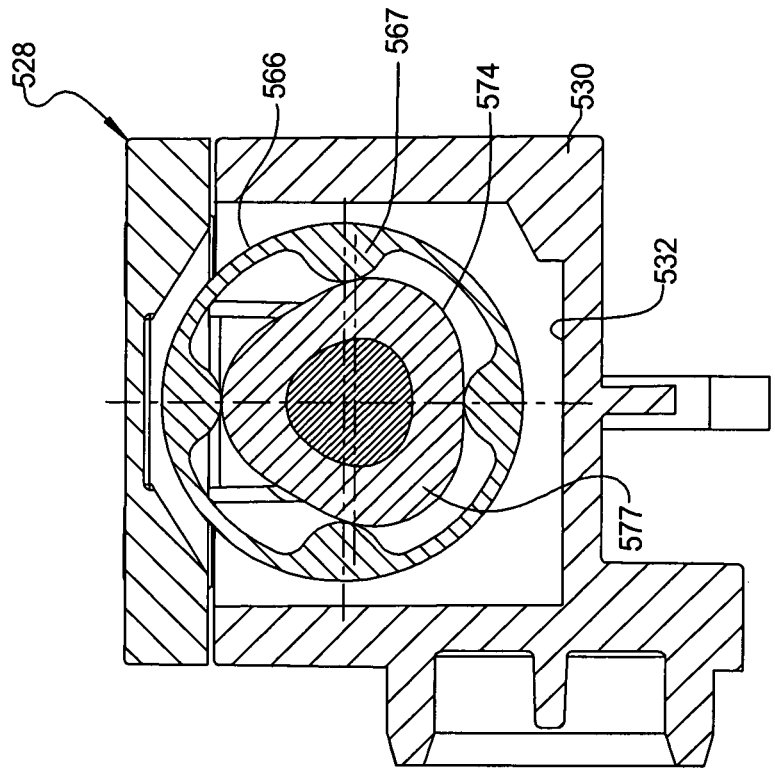
FIG. 41 is a sectional view taken along line B-B of FIG. 35 and illustrating an eccentric position at one hundred eighty degrees of operation.
Figure 40:
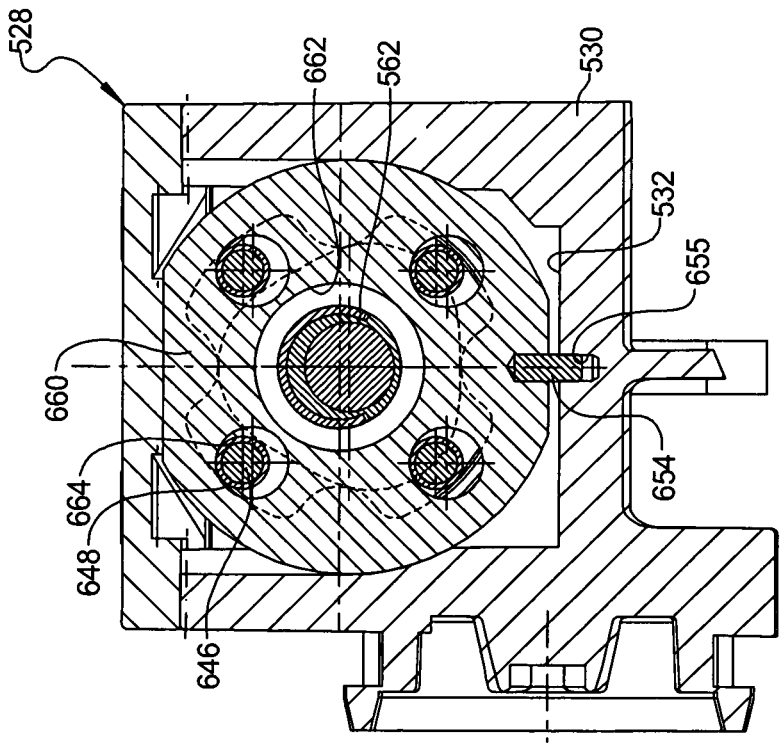
FIG. 40 is a sectional view taken along line A-A of FIG. 35 and illustrating an eccentric position at one hundred eighty degrees of operation.
Figure 43:
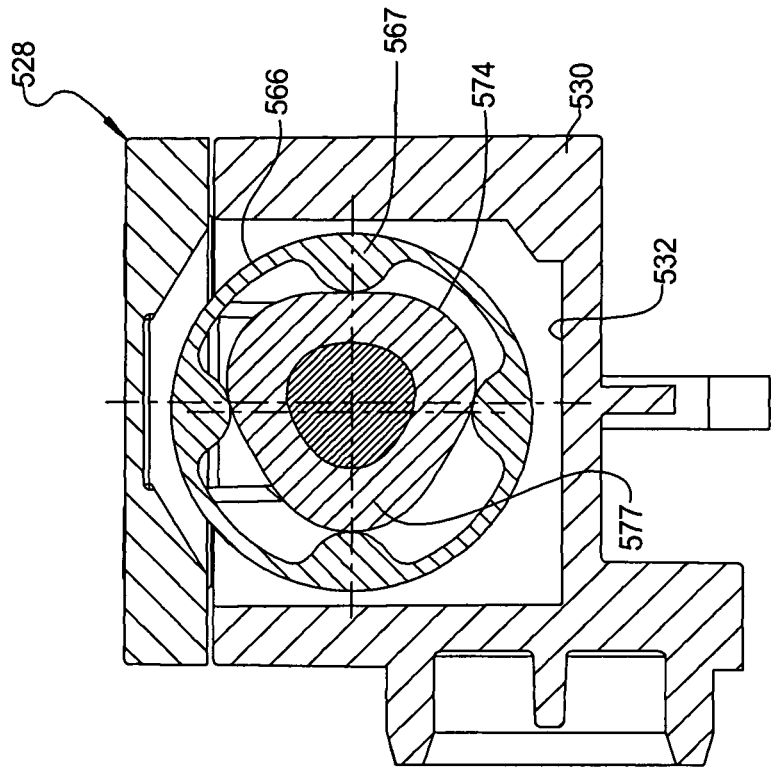
FIG. 43 is a sectional view taken along line B-B of FIG. 35 and illustrating an eccentric position at two hundred seventy degrees of operation.
Figure 42:
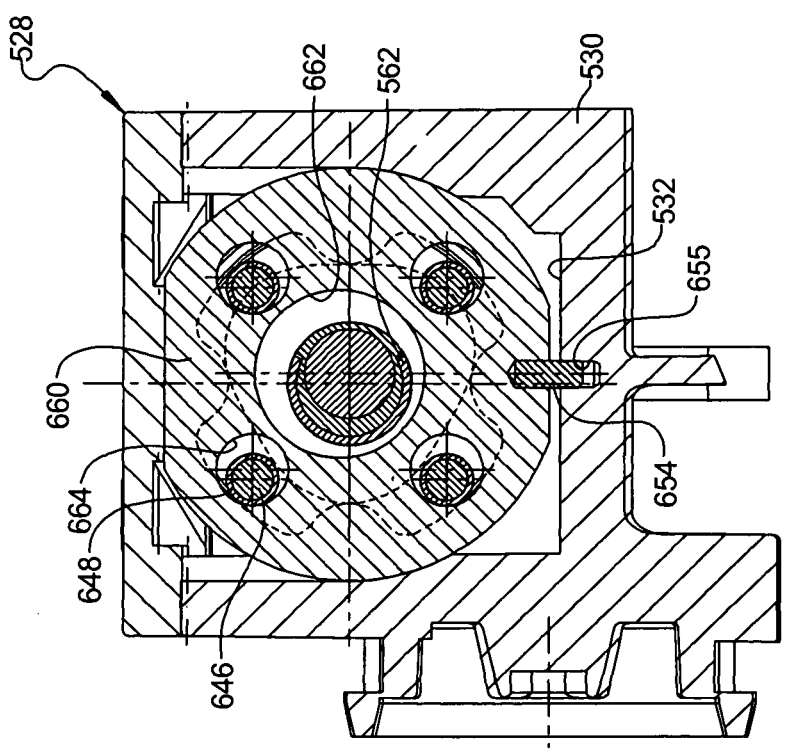
FIG. 42 is a sectional view taken along line A-A of FIG. 35 and illustrating an eccentric position at two hundred seventy degrees of operation.
Figure 44:
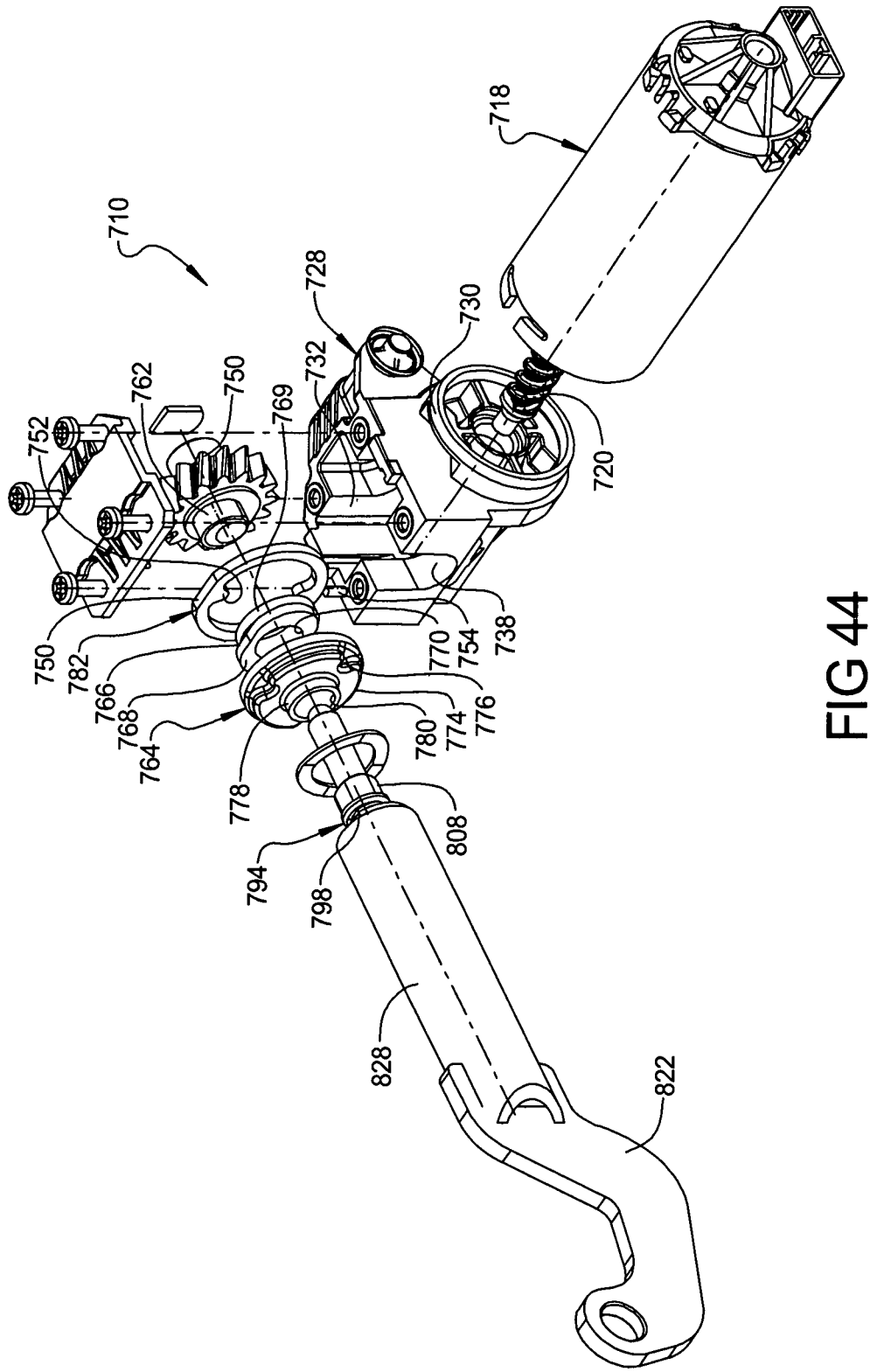
FIG. 44 is an exploded perspective view of a further embodiment, according to the present invention, of the power seat height adjuster mechanism of FIG. 1.

Referring to FIGS. 34 through 43, the operation of the power seat height adjuster mechanism 510 is shown. As illustrated in FIG. 35, the double stage speed reduction mechanism 528 has a speed reduction ratio of $i_t = i_{12} \times i_{s4}$, wherein $i_{12} = z_2/z_1$, is the first stage (worm-worm gear drive) speed reduction ratio and $i_{s4} = -z_4/(z_3-z_4)$, is the second stage (cyclo-planetary gear drive) speed reduction ratio. In the above relations $z_1$, $z_2$, $z_3$ and $z_4$ represent the number of starts of the worm, the number of teeth of the worm gear (helical gear), the number of teeth (internal lobes) of the driving planetary gear 566 and the number of teeth (external lobes) of the driven planetary gear 574, respectively. The minus sign (−), in the expression of the second stage speed reduction ratio shows that the direction of rotation of the driven planetary gear 574 is opposed to the direction of rotation of driven worm gear (helical gear).

As illustrated in FIGS. 35 through 43, in operation, upon activation of a switch (not shown) by a person (not shown), power is supplied to the motor 518. The motor 518 rotates the worm shaft 520 to rotate the helical gear 550. Rotation of the helical gear 550 causes the eccentric plate 562 to rotate, in turn, forcing the eccentric driving planetary gear 566 in a wobbling motion around the worm gear (helical gear) axis. Due to the pin and aperture connection, the stationary plate 660 prevents the rotation of driving planetary gear 566 around its axis, and through the meshing of teeth 567 and 577 to uniformly rotate the driven planetary gear 574 around its own axis, in a speed reduction ratio determined by the difference in the number of teeth (lobes) of the driving and driven planetary gears. The driven planetary gear 574 is coupled to the spindle screw 608, causing the spindle screw 608 to rotate. Rotation of the spindle screw 608 causes the spindle nut 598, supporting tube 628, and hook member 622 to translate linearly as a unit to rotate the adjuster component 16 and adjust the vertical position of the seat portion of the seat 12.

When the seat 12 is adjusted vertically to its desired position, the switch is disengaged by the person and power is discontinued to the motor 518. Due to the load on the seat 12 and vibrations of the vehicle, the spindle nut 598 will attempt to rotate the spindle screw 508 in the opposite direction along with the driven planetary gear 574. The attempted rotation of the driven planetary gear 574 acts on the driving planetary gear 566. This attempted motion of the driving planetary gear 566 tries to move upwardly and rotate, but is prevented from movement due the stationary plate 660. As a result, no further movement is transmitted through the speed reduction mechanism 528 to the motor 518 and the seat 12 remains in the adjusted position. It should be appreciated that the locking mechanism 582 prevents reverse rotation of the worm shaft 520, thereby preventing a drop in height of the seat portion of the seat 12.

Referring to FIGS. 44 through 53, a further embodiment, according to the present invention, of the power seat height adjuster mechanism 10 is shown. Like parts have like reference numerals increased by seven hundred (700). In this embodiment, the power seat height adjuster mechanism 710 includes the motor 718, speed reduction mechanism 728, planetary gear drive 764, locking mechanism 782, and nut drive mechanism 794. It should be appreciated that the planetary gear drive 764 is a cycloidal double-planetary gear drive.

The planetary gear drive 764 includes a driving planetary gear 766 having first outer teeth (lobes) 768 and second outer teeth (lobes) 769 for a function to be described. The driving planetary gear 766 has a central aperture 770 extending therethrough. The planetary gear drive 764 also includes a driven planetary gear 774 having inner teeth (lobes) 776. The driven planetary gear 774 has an annular front portion 778 disposed in the recess 738 of the gearbox housing 730. The driven planetary gear 774 has an aperture 780 extending axially through the front portion 778. The planetary gear drive 764 includes a stationary planetary gear 750 having inner teeth (lobes) 752. The stationary planetary gear 750 is disposed in the cavity 732 of the gearbox housing 730. The gears 766 and 774 are made of metal material and are either stamped and/or sintered. It should be appreciated that the speed reduction mechanism 728 has a first stage reduction made up of worm-worm gear drive (worm-helical gear drive) and a second stage reduction made up of a double-planetary gear drive 764.

The locking mechanism 782 includes the stationary planetary gear 750 and a locking pin 754 disposed in an aperture 755 of both the planetary gear 750 and the gearbox housing 730. The locking pin 754 is made of a metal material. It should be appreciated that the locking mechanism 782 is a self-locking cycloid gear.

Figure 45:
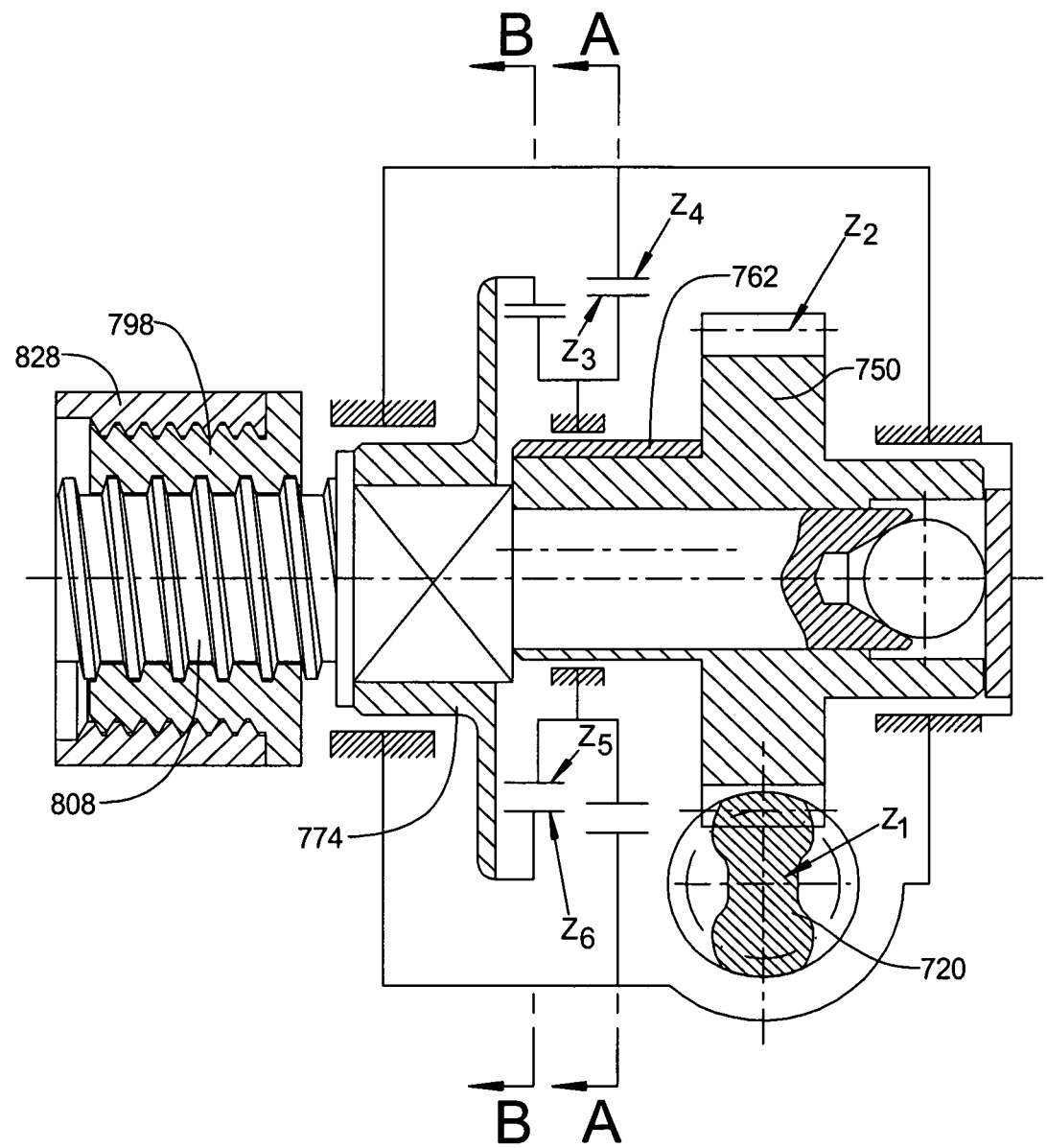
FIG. 45 is a diagrammatic view of the power seat height adjuster mechanism of FIG. 44.
Figure 47:
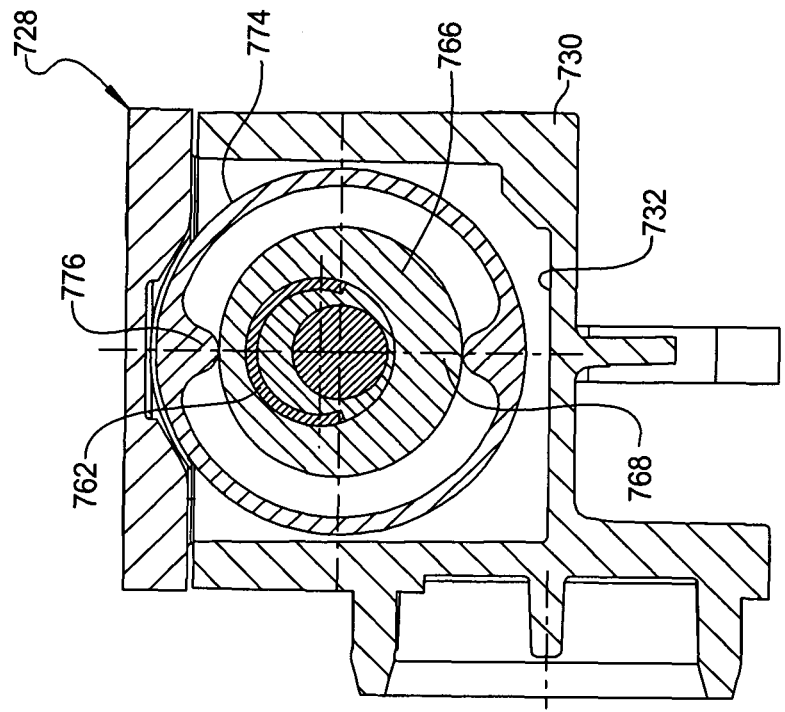
FIG. 47 is a sectional view taken along line B-B of FIG. 45 and illustrating an eccentric position at zero degrees of operation.
Figure 46:
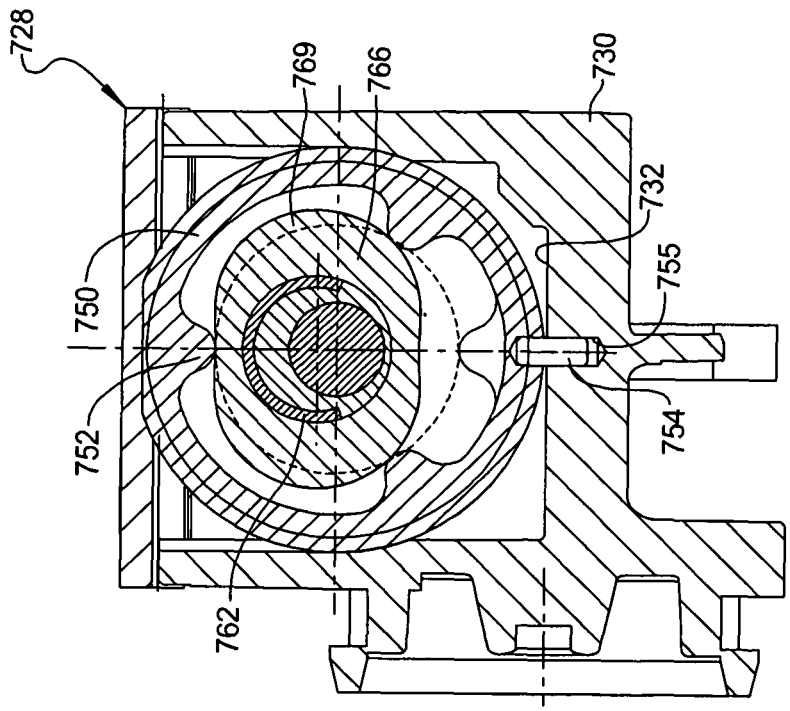
FIG. 46 is a sectional view taken along line A-A of FIG. 45 and illustrating an eccentric position at zero degrees of operation.
Figure 49:
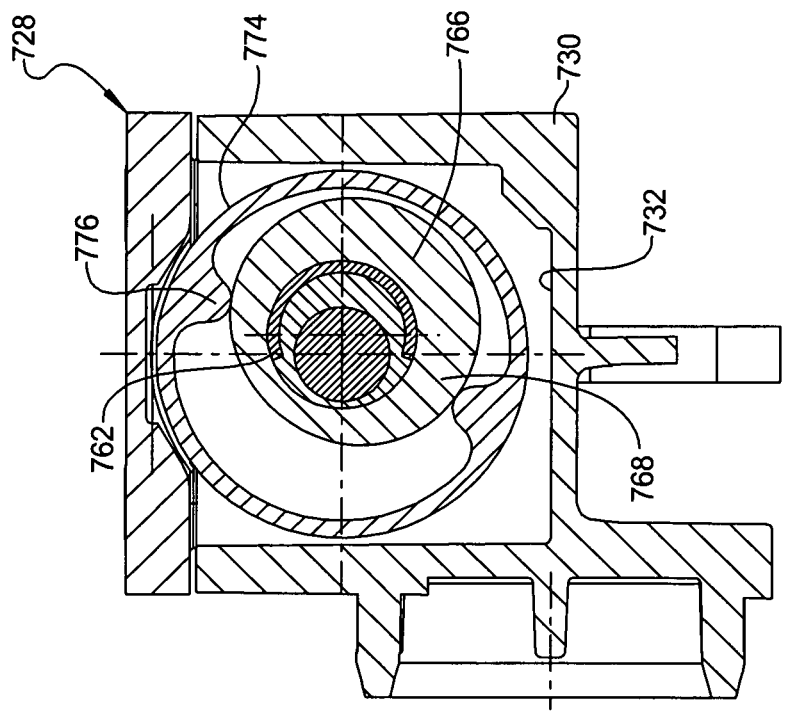
FIG. 49 is a sectional view taken along line B-B of FIG. 45 and illustrating an eccentric position at ninety degrees of operation.
Figure 48:
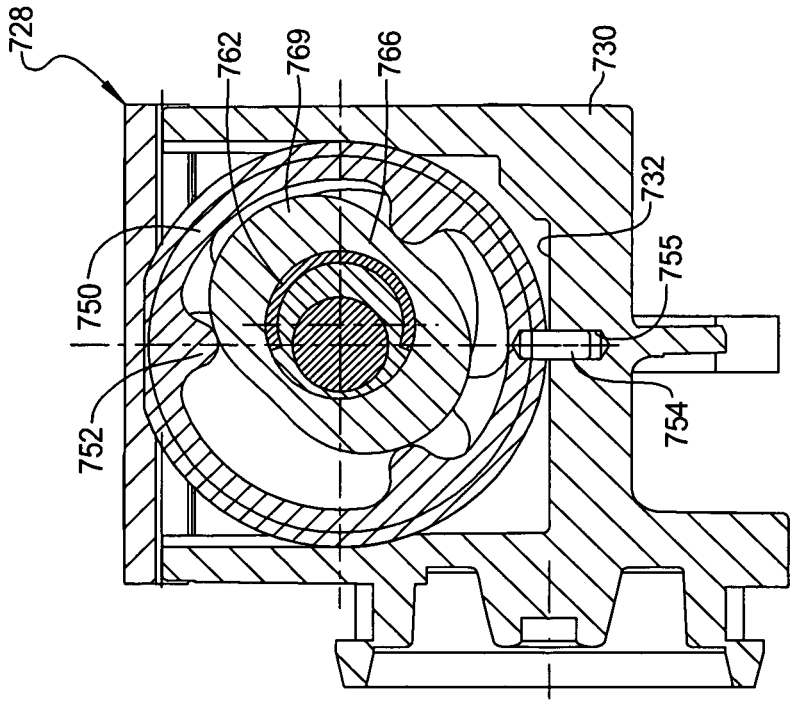
FIG. 48 is a sectional view taken along line A-A of FIG. 45 and illustrating an eccentric position at ninety degrees of operation.
Figure 51:
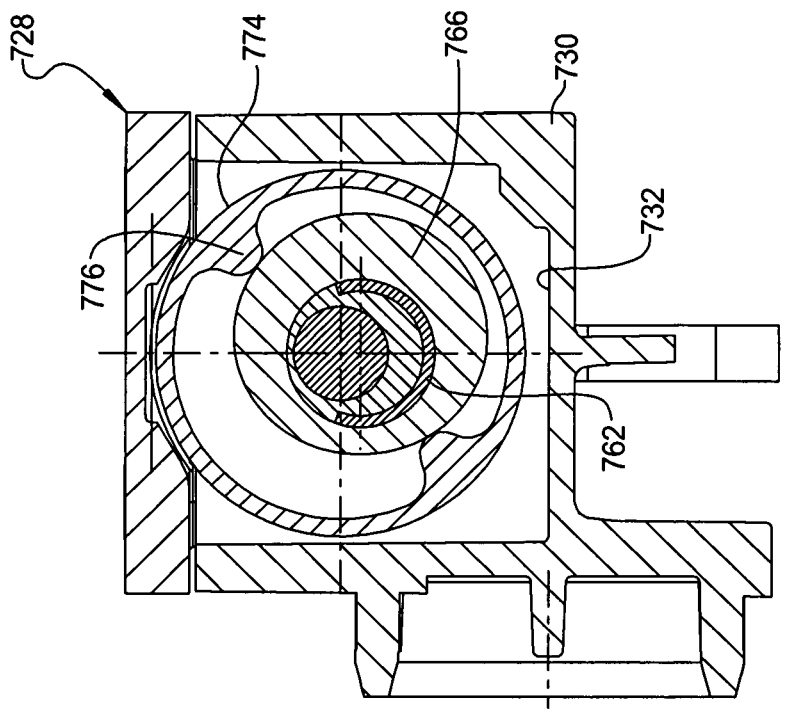
FIG. 51 is a sectional view taken along line B-B of FIG. 45 and illustrating an eccentric position at one hundred eighty degrees of operation.
Figure 50:
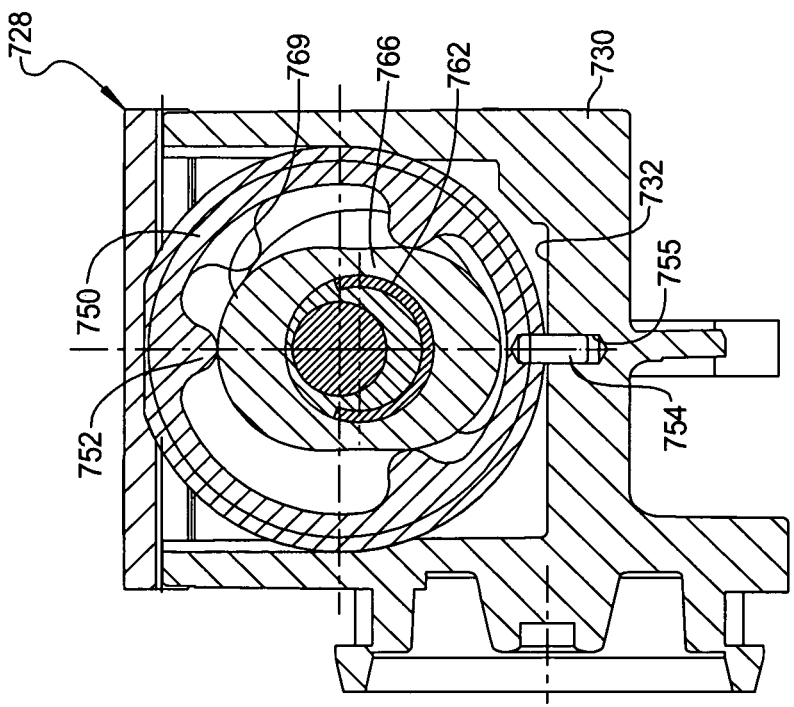
FIG. 50 is a sectional view taken along line A-A of FIG. 45 and illustrating an eccentric position at one hundred eighty degrees of operation.
Figure 53:
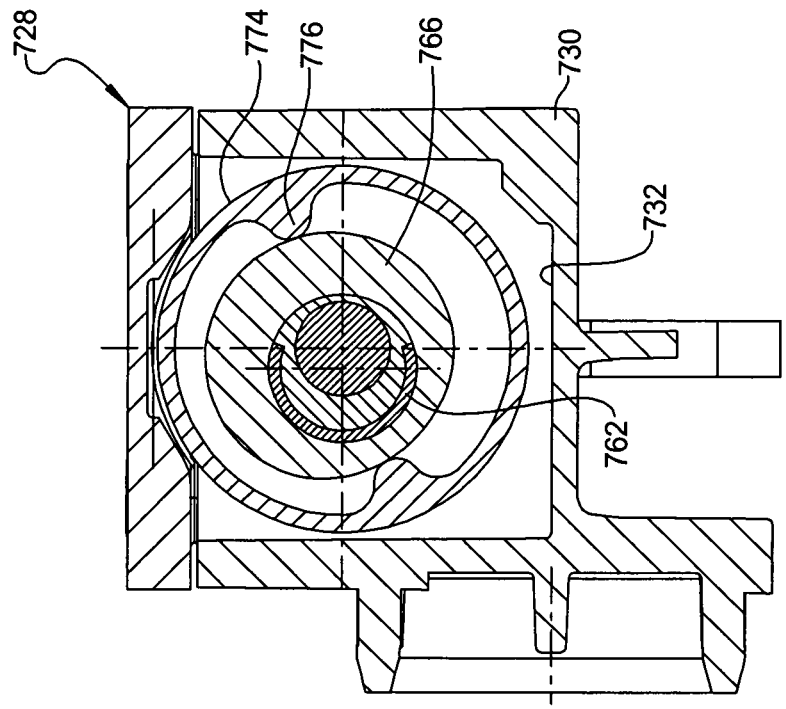
FIG. 53 is a sectional view taken along line B-B of FIG. 45 and illustrating an eccentric position at two hundred seventy degrees of operation.
Figure 52:
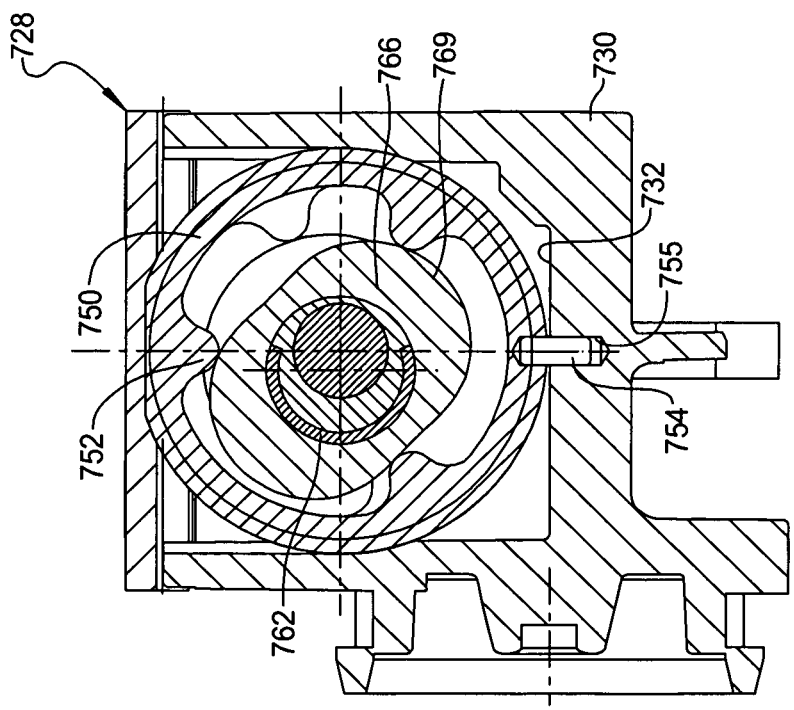
FIG. 52 is a sectional view taken along line A-A of FIG. 45 and illustrating an eccentric position at two hundred seventy degrees of operation.
Figure 54:
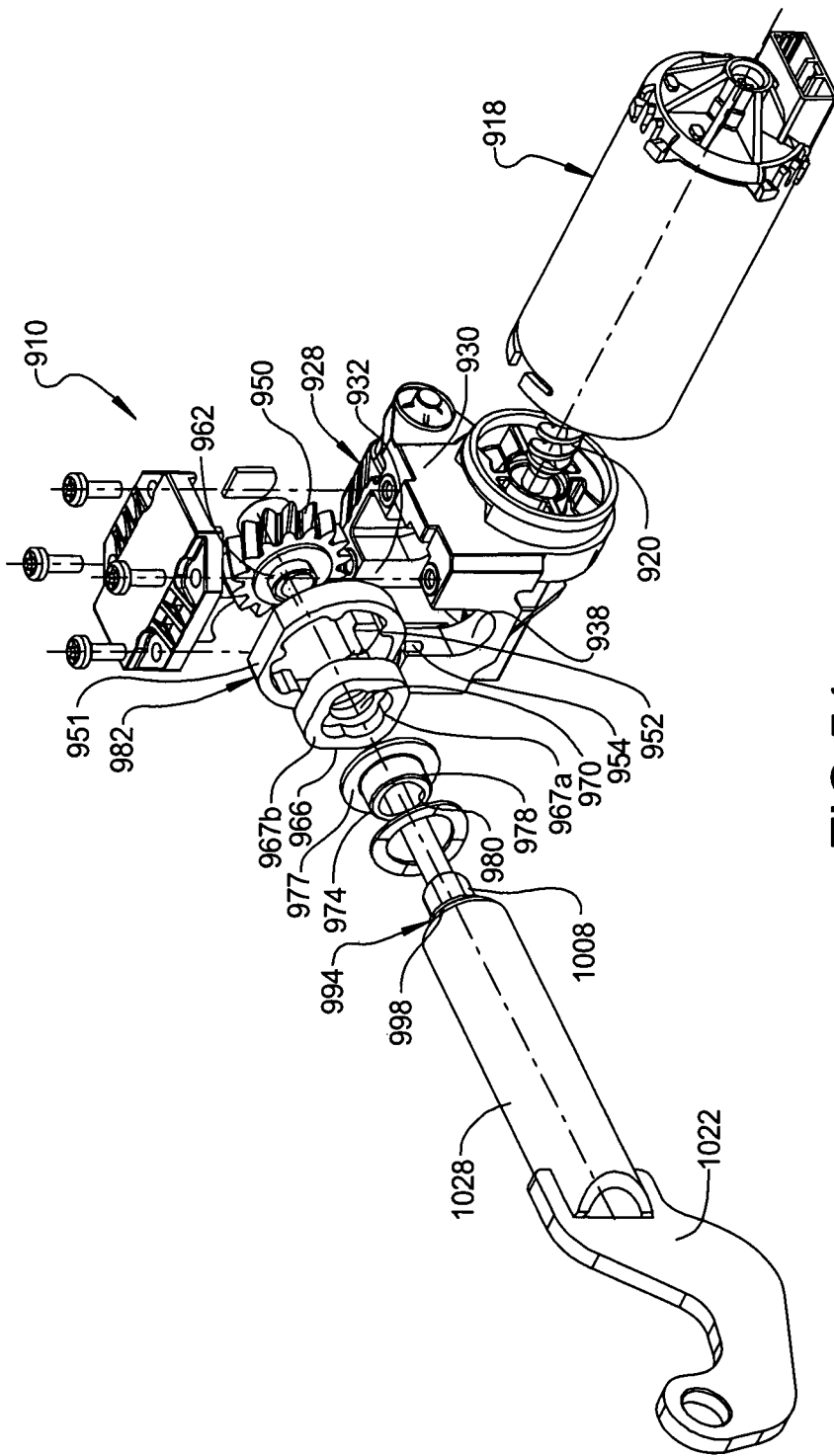
FIG. 54 is an exploded perspective view of a still further embodiment, according to the present invention, of the power seat height adjuster mechanism of FIG. 1.

Referring to FIGS. 44 through 53, the operation of the power seat height adjuster mechanism 710 is shown. As illustrated in FIG. 45, the double stage speed reduction mechanism 728 has a speed reduction ratio of $i_t=i_{12} \times i_{s6}$, wherein $i_{12}=z_2/z_1$, is the first stage (worm-worm gear drive) speed reduction ratio and $i_{s6}=1/[1-(z_5 \times z_4)/(z_6 \times z_3)]$, is the second stage (double cyclo-planetary gear drive) speed reduction ratio. In the above relations $z_1$, $z_2$, $z_3$, $z_4$, $z_5$ and $z_6$, represent the number of starts of the worm, the number of teeth of the worm gear (helical gear), the number of teeth (external lobes 769) of the driving planetary gear 766, the number of teeth (internal lobes 752) of stationary planetary gear 750, the number of teeth (external lobes 768) of the driving planetary gear 766 and the number of teeth (internal lobes 776) of the driven planetary gear 774, respectively. For a maximum speed reduction ratio, the relations used between the number of teeth are: $z_6=z_3$; $z_5=z_6-1$; $z_4=z_6+1$. The direction of rotation of the driven planetary gear 774 is the same as the direction of rotation of driven worm gear (helical gear).

As illustrated in FIGS. 45 through 53, in operation, upon activation of a switch (not shown) by a person (not shown), power is supplied to the motor 718. The motor 718 rotates the worm shaft 720 to rotate the helical gear 750. Rotation of the helical gear 750 causes the eccentric plate 762 to rotate. Due to the rotation, the outer teeth (lobes) of driving planetary gear 766 are forced into meshing with inner teeth (lobes) of driven and stationary planetary gears, the result being a uniform rotation of driven planetary gear 774. The driven planetary gear 774 is coupled to the spindle screw 808, causing the spindle screw 808 to rotate. Rotation of the spindle screw 808 causes the spindle nut 798, supporting tube 828, and hook member 822 to translate linearly as a unit to rotate the adjuster component 16 and adjust the vertical position of the seat portion of the seat 12.

When the seat 12 is adjusted vertically to its desired position, the switch is disengaged by the person and power is discontinued to the motor 718. Due to the load on the seat 12 and vibrations of the vehicle, the spindle nut 798 will attempt to rotate the spindle screw 808 in the opposite direction along with the driven planetary gear 774. The attempted rotation of the driven planetary gear 774 acts on the driving planetary gear 766. This attempted motion of the driving planetary gear 766 tries to move upwardly, but is prevented from movement due the stationary planetary gear 750. As a result, no further movement is transmitted through the speed reduction mechanism 728 to the motor 718 and the seat 12 remains in the adjusted position. It should be appreciated that the locking mechanism 782 prevents reverse rotation of the worm shaft 720, thereby preventing a drop in height of the seat portion of the seat 12.

Referring to FIGS. 54 through 63, yet a further embodiment, according to the present invention, of the power seat height adjuster mechanism 10 is shown. Like parts have like reference numerals increased by nine hundred (900). In this embodiment, the power seat height adjuster mechanism 910 includes the motor 918, speed reduction mechanism 928, planetary gear drive 964, locking mechanism 982, and nut drive mechanism 994. It should be appreciated that the planetary gear drive 964 is a cycloidal double-planetary gear drive.

The planetary gear drive 964 includes a driving planetary gear 966 having inner teeth (lobes) 967a and outer teeth (lobes) 967b. The driving planetary gear 966 has a central aperture 970 extending axially therethrough. The planetary gear drive 964 also includes a driven planetary gear 974 having outer teeth (lobes) 977. The driven planetary gear 974 has an annular front portion 978 disposed in the recess 938 of the gearbox housing 930. The driven planetary gear 974 has an aperture 980 extending axially through the front portion 978 and therethrough. The planetary gear drive 964 includes a stationary planetary gear 950 having inner teeth (lobes) 952. The planetary gear 950 is disposed in the cavity 932 of the gearbox housing 930. It should be appreciated that the speed reduction mechanism 928 has a first stage reduction made up of worm-worm gear drive (worm-helical gear drive) and a second stage reduction made up of a double-planetary gear drive 964.

The locking mechanism 982 includes the planetary gear 950 and a locking pin 954 disposed in an aperture 955 of both the planetary gear 950 and the gearbox housing 930. The locking pin 954 is made of a metal material. It should be appreciated that the locking mechanism 982 is a self-locking cycloid gear.

Figure 55:
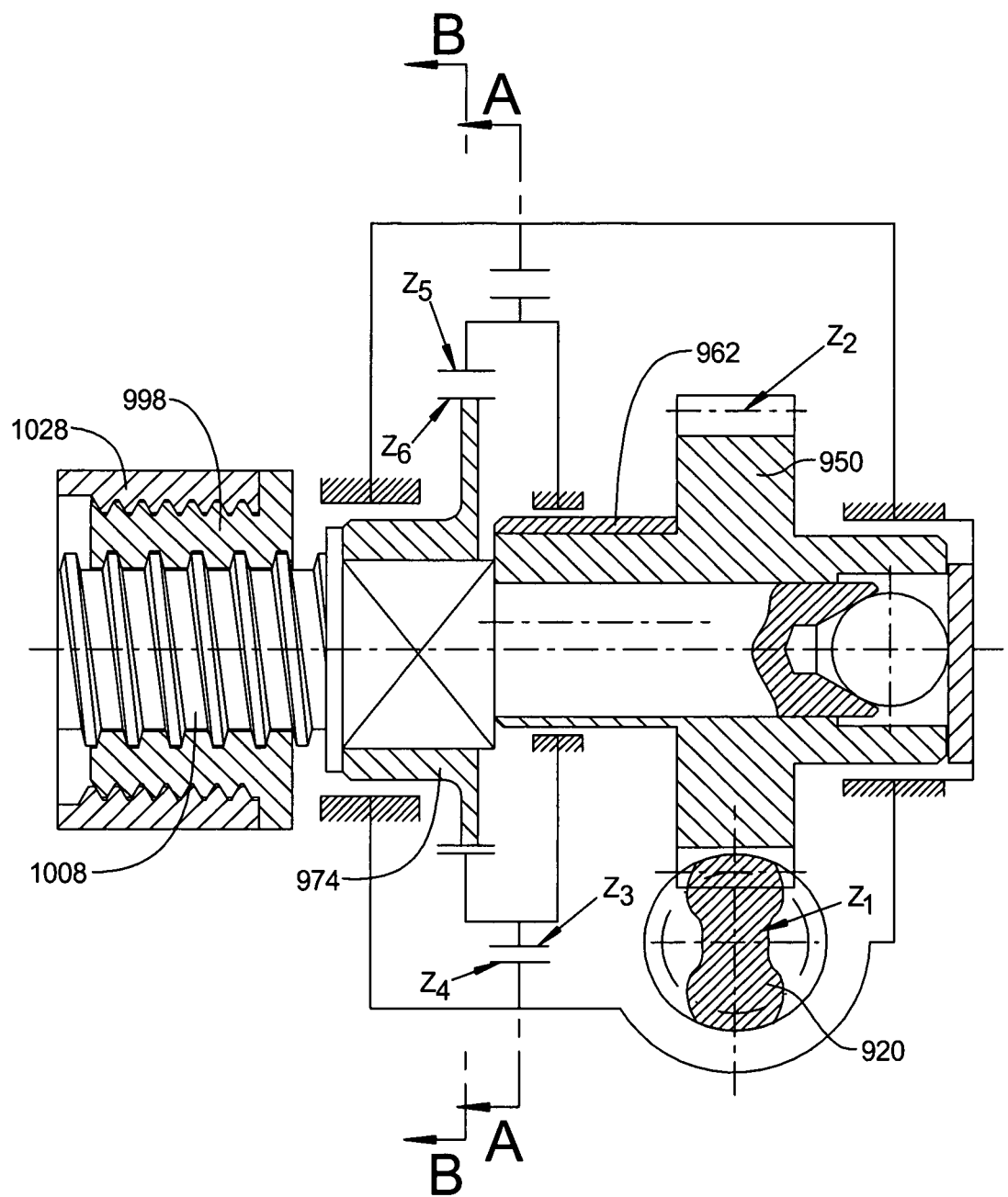
FIG. 55 is a diagrammatic view of the power seat height adjuster mechanism of FIG. 54.
Figure 57:
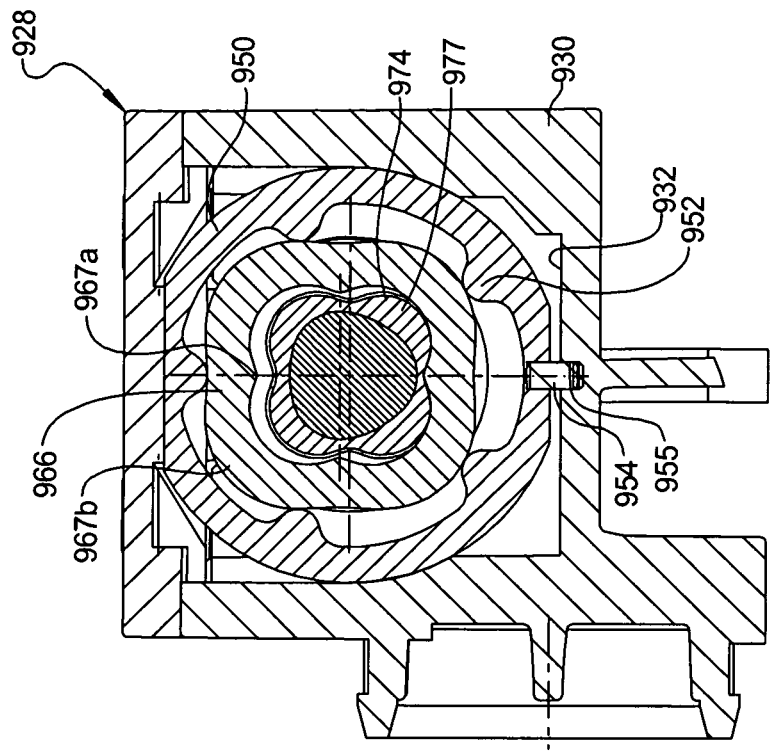
FIG. 57 is a sectional view taken along line B-B of FIG. 55 and illustrating an eccentric position at zero degrees of operation.
Figure 56:
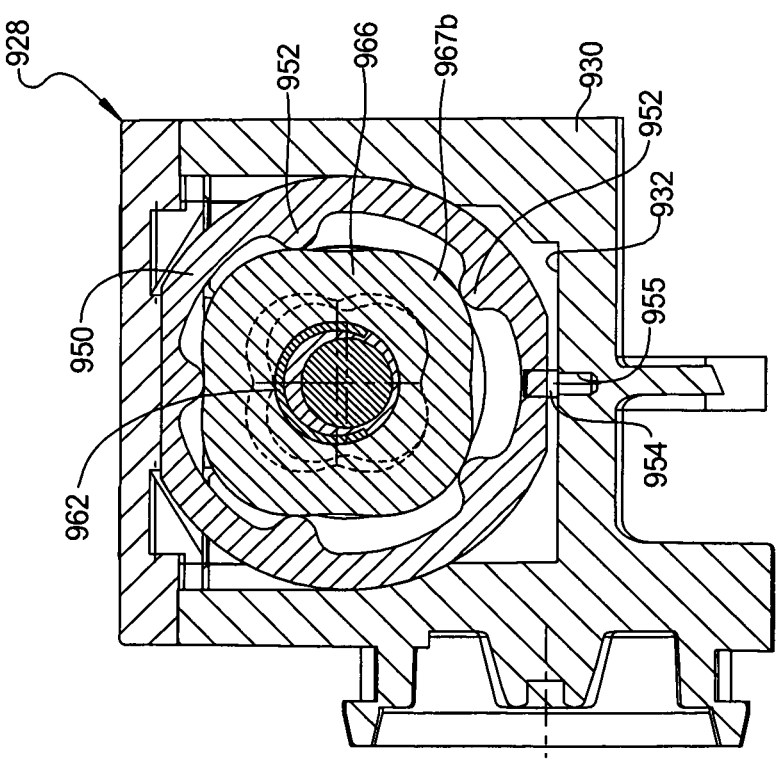
FIG. 56 is a sectional view taken along line A-A of FIG. 55 and illustrating an eccentric position at zero degrees of operation.
Figure 59:
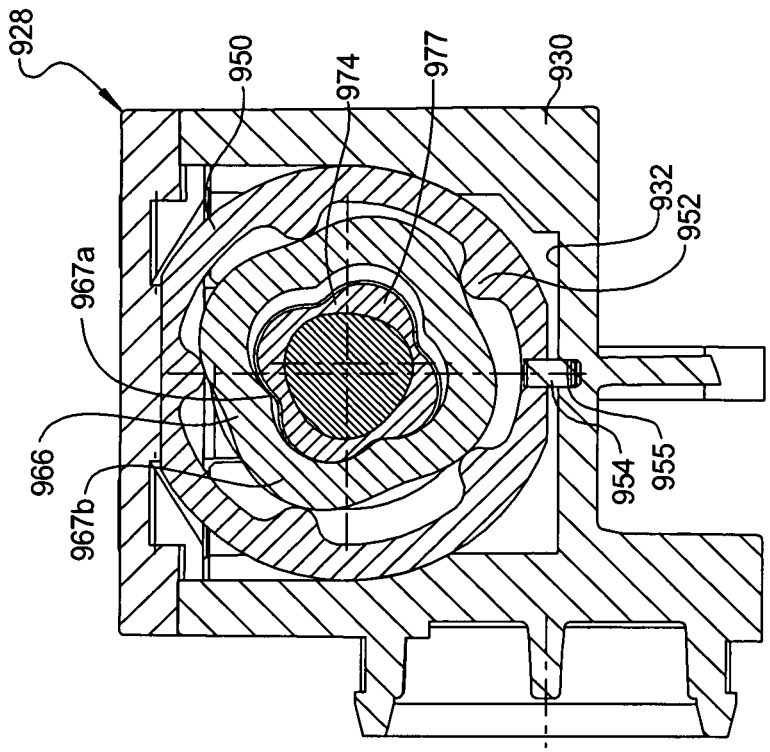
FIG. 59 is a sectional view taken along line B-B of FIG. 55 and illustrating an eccentric position at ninety degrees of operation.
Figure 58:
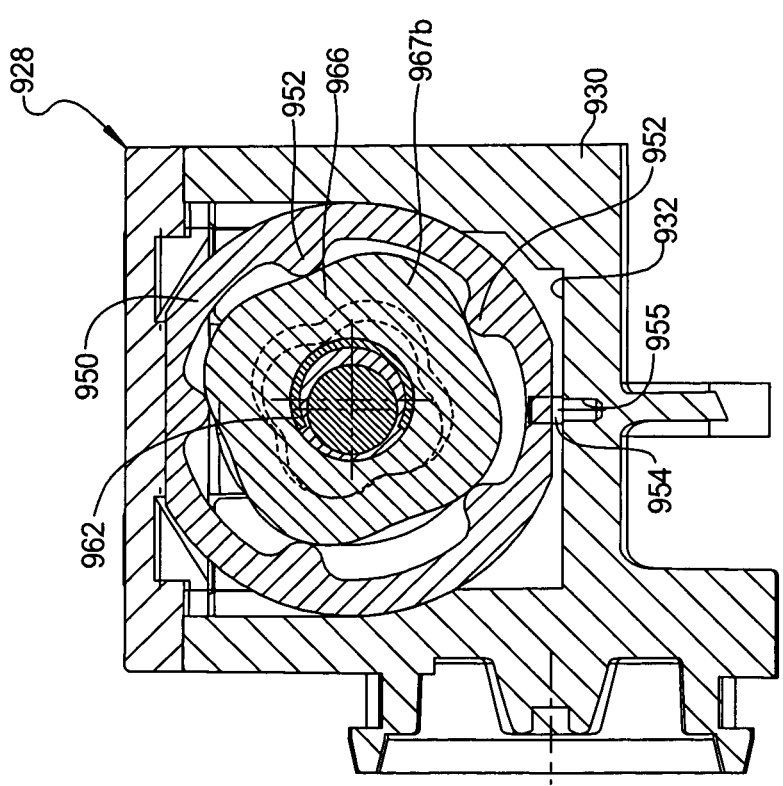
FIG. 58 is a sectional view taken along line A-A of FIG. 55 and illustrating an eccentric position at ninety degrees of operation.
Figure 61:
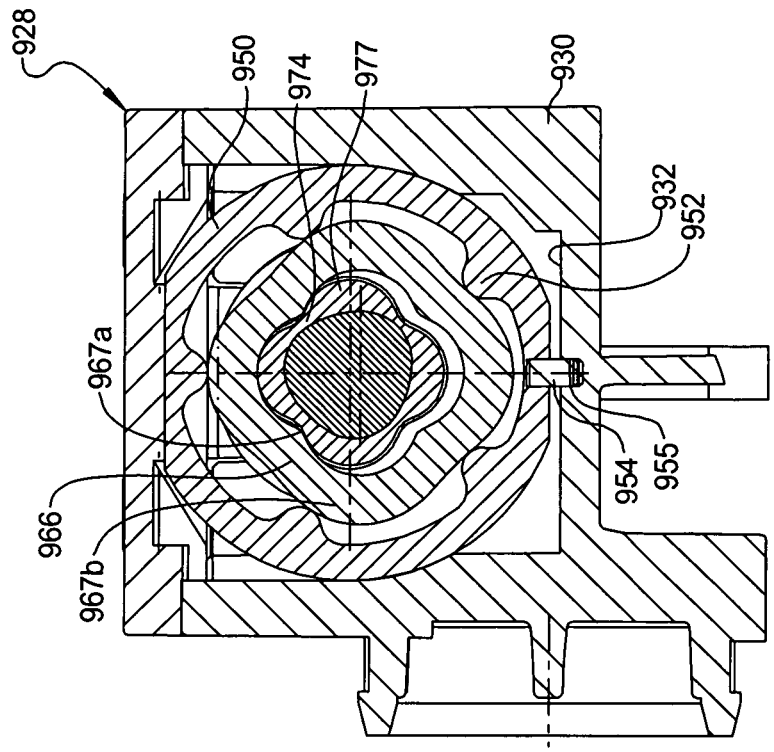
FIG. 61 is a sectional view taken along line B-B of FIG. 55 and illustrating an eccentric position at one hundred eighty degrees of operation.
Figure 60:
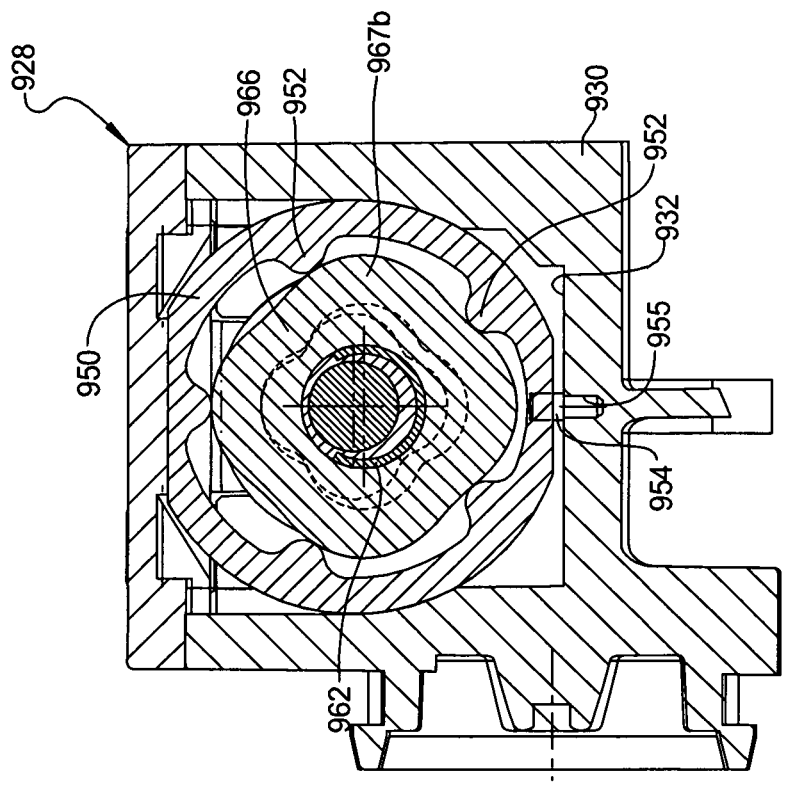
FIG. 60 is a sectional view taken along line A-A of FIG. 55 and illustrating an eccentric position at one hundred eighty degrees of operation.

Referring to FIGS. 54 through 63, the operation of the power seat height adjuster mechanism 910 is shown. As illustrated in FIG. 55, the double stage speed reduction mechanism 928 has a speed reduction ratio of $i_t=i_{12} \times i_{s6}$, wherein $i_{12}=z_2/z_1$, is the first stage (worm-worm gear drive) speed reduction ratio and $i_{s6}=1/[1-(z_5 \times z_4)/(z_6 \times z_3)]$, is the second stage (double cyclo-planetary gear drive) speed reduction ratio. In the above relations $z_1$, $z_2$, $z_3$, $z_4$, $z_5$ and $z_6$, represent the number of starts of the worm, the number of teeth of the worm gear (helical gear), the number of teeth (external lobes 967b) of the driving planetary gear 966, the number of teeth (internal lobes 952) of stationary planetary gear 950, the number of teeth (internal lobes 967a) of the driving planetary gear 966 and the number of teeth (external lobes 977) of the driven planetary gear 974, respectively. The direction of rotation of the driven planetary gear 974 is the same as the direction of rotation of driven worm gear (helical gear).

As illustrated in FIGS. 55 through 63, in operation, upon activation of a switch (not shown) by a person (not shown), power is supplied to the motor 918. The motor 918 rotates the worm shaft 920 to rotate the helical gear 950. Rotation of the helical gear 950 causes the eccentric plate 962 to rotate. Due to the rotation, the outer teeth (lobes) of driving planetary gear 966 are forced into meshing with inner teeth (lobes) of stationary planetary gears and the inner teeth (lobes) of driving planetary gear 966 will mesh with the outer teeth (lobes) of driven planetary gear 974 forcing the last in a uniform rotation. The driven planetary gear 974 is coupled to the spindle screw 1008, causing the spindle screw 1008 to rotate. Rotation of the spindle screw 1008 causes the spindle nut 998, supporting tube 1028, and hook member 1022 to translate linearly as a unit to rotate the adjuster component 16 and adjust the vertical position of the seat portion of the seat 12.

When the seat 12 is adjusted vertically to its desired position, the switch is disengaged by the person and power is discontinued to the motor 918. Due to the load on the seat 12 and vibrations of the vehicle, the spindle nut 998 will attempt to rotate the spindle screw 1008 in the opposite direction along with the driven planetary gear 974. The attempted rotation of the driven planetary gear 974 acts on the driving planetary gear 966. This attempted motion of the driving planetary gear 966 tries to move upwardly, but is prevented from movement due the stationary planetary gear 950. As a result, no further movement is transmitted through the speed reduction mechanism 928 to the motor 918 and the seat 12 remains in the adjusted position. It should be appreciated that the locking mechanism 982 prevents reverse rotation of the worm shaft 920, thereby preventing a drop in height of the seat portion of the seat 12.

Advantageously, the power seat height adjuster mechanism 10, 110, 310, 510, 710, 910 provides a 100% self-locking mechanism. The power seat height adjuster mechanism 10, 110, 310, 510, 710, 910 has a higher total efficiency of transmission in a compact space. The power seat height adjuster mechanism 10, 110, 310, 510, 710, 910 is easy to assemble from one direction. The power seat height adjuster mechanism 10, 110, 310, 510, 710, 910 has smooth running and strong shock capabilities due to cycloidal profiles of the second stage. The power seat height adjuster mechanism 10, 110, 310, 510, 710, 910 has a higher transmission efficiency for worm gear drive and spindle drive applications. The power seat height adjuster mechanism 10, 110, 310, 510, 710, 910 has versatility in selection of gear set materials and their method of manufacturing.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A power seat height adjuster mechanism for a seat of a vehicle comprising:
    a motor having an output shaft;
    a speed reduction mechanism comprising a housing and a planetary gear drive disposed in said housing and cooperating with said output shaft of said motor to reduce an output speed of said motor;
    a nut drive mechanism cooperating with said speed reduction mechanism and having a translatable output member to rotate an adjustment component of the seat to adjust a height of the seat; and
    a locking mechanism disposed in said housing and cooperating with said planetary gear drive to allow the height of the seat to be adjusted and to prevent the height of the seat from moving once the height has been adjusted;
    wherein said planetary gear drive includes a driving planetary gear and a driven planetary gear cooperating with said driving planetary gear; and
    wherein said locking mechanism includes a member acting on either one of said driving planetary gear and said driven planetary gear to prevent reverse rotation thereof once the height of the seat has been adjusted due to said member cooperating with said housing and being prevented from rotational movement.

2. A power seat height adjuster mechanism as set forth in claim 1 wherein said driving planetary gear has outer teeth and said driven planetary gear has inner teeth cooperating with said outer teeth.

3. A power seat height adjuster mechanism for a seat of a vehicle comprising:
    a motor having an output shaft;
    a speed reduction mechanism cooperating with said output shaft of said motor to reduce an output speed of said motor;
    a nut drive mechanism cooperating with said speed reduction mechanism and having a translatable output member to rotate an adjustment component of the seat to adjust a height of the seat;
    a locking mechanism cooperating with said speed reduction mechanism to allow the height of the seat to be adjusted and to prevent the height of the seat from moving once the height has been adjusted; and
    wherein said locking mechanism includes a locking plate and at least one locking plate support cooperating with said locking plate to allow only lateral movement of said locking plate.

4. A power seat height adjuster mechanism for a seat of a vehicle comprising:
    a motor having an output shaft;
    a speed reduction mechanism cooperating with said output shaft of said motor to reduce an output speed of said motor;
    a nut drive mechanism cooperating with said speed reduction mechanism and having a translatable output member to rotate an adjustment component of the seat to adjust a height of the seat;
    a locking mechanism cooperating with said speed reduction mechanism to allow the height of the seat to be adjusted and to prevent the height of the seat from moving once the height has been adjusted;
    wherein said speed reduction mechanism includes a planetary gear drive having a driving planetary gear and a driven planetary gear cooperating with said driving planetary gear;
    wherein said locking mechanism includes a locking plate and at least one locking plate support cooperating with said locking plate to allow only lateral movement of said locking plate; and
    wherein said driving planetary gear has opposed projections extending axially and said locking plate has opposed slots extending radially for receiving said projections.

5. A power seat height adjuster mechanism as set forth in claim 1 wherein said driving planetary gear has inner teeth and said driven planetary gear has outer teeth cooperating with said inner teeth.

6. A power seat height adjuster mechanism as set forth in claim 5 wherein said member comprises a locking plate and said locking mechanism includes at least one locking plate support cooperating with said locking plate to allow only lateral movement of said locking plate.

7. A power seat height adjuster mechanism as set forth in claim 6 wherein said driving planetary gear has opposed projections extending axially and said locking plate has opposed slots offset radially for receiving said projections.

8. A power seat height adjuster mechanism as set forth in claim 1 wherein said driving planetary gear has outer teeth with a plurality of apertures, one of said apertures extending axially through one of said outer teeth.

9. A power seat height adjuster mechanism as set forth in claim 8 wherein said driven planetary gear includes a plurality of pins with one of said pins cooperating with one of said apertures.

10. A power seat height adjuster mechanism as set forth in claim 9 wherein said locking mechanism includes a stationary planetary gear having inner teeth cooperating with said outer teeth.

11. A power seat height adjuster mechanism as set forth in claim 1 wherein said driving planetary gear has inner teeth.

12. A power seat height adjuster mechanism as set forth in claim 11 wherein said driven planetary gear is a driven hub having outer teeth cooperating with said inner teeth.

13. A power seat height adjuster mechanism as set forth in claim 12 wherein said driving planetary gear includes a plurality of pins.

14. A power seat height adjuster mechanism as set forth in claim 13 wherein said locking mechanism includes a stationary plate having with a plurality of apertures, one of said apertures receiving one of said pins.

15. A power seat height adjuster mechanism as set forth in claim 1 wherein said driving planetary gear has first outer teeth and second outer teeth.

16. A power seat height adjuster mechanism as set forth in claim 15 wherein said driven planetary gear includes inner teeth cooperating with said first outer teeth.

17. A power seat height adjuster mechanism as set forth in claim 16 wherein said locking mechanism includes a stationary planetary gear having inner teeth cooperating with said second outer teeth.

18. A power seat height adjuster mechanism as set forth in claim 1 wherein said driving planetary gear has inner teeth and outer teeth.

19. A power seat height adjuster mechanism as set forth in claim 18 wherein said driven planetary gear includes outer teeth cooperating with said inner teeth.

20. A power seat height adjuster mechanism as set forth in claim 19 wherein said locking mechanism includes a stationary planetary gear having inner teeth cooperating with said outer teeth.

21. A power seat height adjuster mechanism as set forth in claim 1 wherein said housing has a cavity therein.

22. A power seat height adjuster mechanism as set forth in claim 21 wherein said speed reduction mechanism includes a helical gear disposed within said cavity of said housing and having a plurality of teeth cooperating with said output shaft of said motor.

23. A power seat height adjuster mechanism as set forth in claim 22 wherein said speed reduction mechanism includes an eccentric plate connected to said helical gear and cooperating with said planetary gear drive.

24. A power seat height adjuster mechanism as set forth in claim 6 wherein said nut drive mechanism includes a non-rotatable spindle nut having internal threads.

25. A power seat height adjuster mechanism as set forth in claim 24 wherein said nut drive mechanism includes a spindle screw rotatable relative to said spindle nut and having external threads cooperating with said internal threads for translating said spindle nut.

26. A power seat height adjuster mechanism as set forth in claim 25 including a hook member adapted for connection to an adjuster component of the seat.

27. A power seat height adjuster mechanism as set forth in claim 26 including a supporting tube disposed over said spindle screw and connected to said hook member and said spindle nut.

28. A power seat height adjuster mechanism for a seat of a vehicle comprising:
a motor having an output shaft;
a speed reduction mechanism including a helical gear having a plurality of teeth cooperating with said output shaft of said motor and a planetary gear drive cooperating with said helical gear to reduce an output speed of said motor;
a nut drive mechanism cooperating with said planetary gear drive and having a translatable output member to rotate an adjustment component of the seat to adjust a height of the seat;
a locking mechanism cooperating with said planetary gear drive to allow the height of the seat to be adjusted and to prevent the height of the seat from moving once the height has been adjusted;
wherein said planetary gear drive includes a driving planetary gear and a driven planetary gear cooperating with said driving planetary gear, said driving planetary gear having outer teeth and said driven planetary gear having inner teeth cooperating with said outer teeth;
wherein said locking mechanism includes a locking plate and at least one locking plate support cooperating with said locking plate to allow only lateral movement of said locking plate; and
wherein said driving planetary gear has opposed projections extending axially and said locking plate has opposed slots extending radially for receiving said projections.

29. A power seat height adjuster mechanism for a seat of a vehicle comprising:
a motor having an output shaft;
a speed reduction mechanism including a helical gear having a plurality of teeth cooperating with said output shaft of said motor and a planetary gear drive cooperating with said helical gear to reduce an output speed of said motor;
a nut drive mechanism cooperating with said planetary gear drive and having a translatable output member to rotate an adjustment component of the seat to adjust a height of the seat;
a locking mechanism cooperating with said planetary gear drive to allow the height of the seat to be adjusted and to prevent the height of the seat from moving once the height has been adjusted;
wherein said planetary gear drive includes a driving planetary gear and a driven planetary gear cooperating with said driving planetary gear, said driving planetary gear having inner teeth and said driven planetary gear having outer teeth cooperating with said inner teeth;
wherein said locking mechanism includes a locking plate and at least one locking plate support cooperating with said locking plate to allow only lateral movement of said locking plate; and
wherein said driving planetary gear has opposed projections extending axially and said locking plate has opposed slots offset radially for receiving said projections.

30. A power seat height adjuster mechanism for a seat of a vehicle comprising:
a motor having an output shaft;
a speed reduction mechanism including a helical gear having a plurality of teeth cooperating with said output shall of said motor and a housing and a planetary gear drive disposed in said housing and cooperating with said helical gear to reduce an output speed of said motor;

a nut drive mechanism cooperating with said planetary gear drive and having a translatable output member to rotate an adjustment component of the seat to adjust a height of the seat;

a locking mechanism disposed in said housing and cooperating with said planetary gear drive to allow the height of the seat to be adjusted and to prevent the height of the seat from moving once the height has been adjusted; and wherein said planetary gear drive includes a driving planetary gear and a driven planetary gear cooperating with said driving planetary gear, said driving planetary gear having outer teeth with a plurality of apertures, one of said apertures extending axially through one of said outer teeth;

wherein said driven planetary gear includes a plurality of pins with one of said pins cooperating with one of said apertures; and wherein said locking mechanism includes a stationary planetary gear having inner teeth cooperating with said outer teeth to prevent reverse rotation of said driving planetary gear once the height of the seat has been adjusted due to said stationary planetary gear cooperating with said housing and being prevented from rotational movement.

31. A power seat height adjuster mechanism for a seat of a vehicle comprising:

a motor having an output shaft;

a speed reduction mechanism including a helical gear having a plurality of teeth cooperating with said output shaft of said motor and a housing and a planetary gear drive disposed in said housing and cooperating with said helical gear to reduce an output speed of said motor;

a nut drive mechanism cooperating with said planetary gear drive and having a translatable output member to rotate an adjustment component of the seat to adjust a height of the seat;

a locking mechanism disposed in said housing and cooperating with said planetary gear drive to allow the height of the seat to be adjusted and to prevent the height of the seat from moving once the height has been adjusted;

wherein said planetary gear drive includes a driving planetary gear and a driven planetary gear cooperating with said driving planetary gear, said driving planetary gear having inner teeth, said driven planetary gear is a driven hub having outer teeth cooperating with said inner teeth, and said driving planetary gear includes a plurality of pins; and wherein said locking mechanism includes a stationary plate having with a plurality of apertures, one of said apertures receiving one of said pins to prevent reverse rotation of said driving planetary gear once the height of the seat has been adjusted due to said stationary plate cooperating with said housing and being prevented from rotational movement.

32. A power seat height adjuster mechanism for a seat of a vehicle comprising:

a motor having an output shaft;

a speed reduction mechanism including a helical gear having a plurality of teeth cooperating with said output shaft of said motor and a housing and a planetary gear drive disposed in said housing and cooperating with said helical gear to reduce an output speed of said motor;

a nut drive mechanism cooperating with said planetary gear drive and having a translatable output member to rotate an adjustment component of the seat to adjust a height of the seat;

a locking mechanism disposed in said housing and cooperating with said planetary gear drive to allow the height of the seat to be adjusted and to prevent the height of the seat from moving once the height has been adjusted;

wherein said planetary gear drive includes a driving planetary gear and a driven planetary gear cooperating with said driving planetary gear, said driving planetary gear having first outer teeth and second outer teeth and said driven planetary gear including inner teeth cooperating with said first outer teeth; and wherein said locking mechanism includes a stationary planetary gear having inner teeth cooperating with said second outer teeth to prevent reverse rotation of said driving planetary gear once the height of the seat has been adjusted due to said stationary planetary gear cooperating with said housing and being prevented from rotational movement.

33. A power seat height adjuster mechanism for a seat of a vehicle comprising:

a motor having an output shaft;

a speed reduction mechanism including a helical gear having a plurality of teeth cooperating with said output shaft of said motor and a housing and a planetary gear drive disposed in said housing and cooperating with said helical gear to reduce an output speed of said motor;

a nut drive mechanism cooperating with said planetary gear drive and having a translatable output member to rotate an adjustment component of the seat to adjust a height of the seat;

a locking mechanism disposed in said housing and cooperating with said planetary gear drive to allow the height of the seat to be adjusted and to prevent the height of the seat from moving one the height has been adjusted;

wherein said planetary gear drive includes a driving planetary gear and a driven planetary gear cooperating with said driving planetary gear, said driving planetary gear having inner teeth and outer teeth and said driven planetary gear having outer teeth cooperating with said inner teeth; and wherein said locking mechanism includes a stationary planetary gear having inner teeth cooperating with said outer teeth to prevent reverse rotation of said driving planetary gear once the height of the seat has been adjusted due to said stationary planetary gear cooperating with said housing and being prevented from rotational movement.

* * * * *

UNITED STATES PATENT AND TRADEMARK OFFICE
CERTIFICATE OF CORRECTION

PATENT NO. : 8,556,762 B2
APPLICATION NO. : 12/405371
DATED : October 15, 2013
INVENTOR(S) : Mircea Napau et al.

It is certified that error appears in the above-identified patent and that said Letters Patent is hereby corrected as shown below:

In the Claims:

Column 20, line 67 delete "shall" and insert therefor --shaft--.

Column 22, line 44 delete "one" and insert therefor --once--.

Signed and Sealed this
Tenth Day of December, 2013

Margaret A. Focarino
*Commissioner for Patents of the United States Patent and Trademark Office*